United States Patent
Wong et al.

(10) Patent No.: US 9,365,432 B2
(45) Date of Patent: Jun. 14, 2016

(54) TITANATE AND TITANIA NANOSTRUCTURES AND NANOSTRUCTURE ASSEMBLIES, AND METHODS OF MAKING SAME

(71) Applicant: The Research Foundation for The State University of New York, Albany, NY (US)

(72) Inventors: Stanislaus S. Wong, Stony Brook, NY (US); Yuanbing Mao, Los Angeles, CA (US)

(73) Assignee: THE RESEARCH FOUNDATION OF STATE UNIVERSITY OF NEW YORK, Albany, NY (US)

(*) Notice: Subject to any disclaimer, the term of this patent is extended or adjusted under 35 U.S.C. 154(b) by 160 days.

(21) Appl. No.: 13/872,867

(22) Filed: Apr. 29, 2013

(65) Prior Publication Data

US 2015/0239748 A1 Aug. 27, 2015

Related U.S. Application Data

(62) Division of application No. 12/004,105, filed on Dec. 18, 2007, now Pat. No. 8,440,162.

(60) Provisional application No. 60/875,786, filed on Dec. 18, 2006.

(51) Int. Cl.
| | |
|---|---|
| *C01G 23/00* | (2006.01) |
| *C01D 13/00* | (2006.01) |
| *C01G 23/04* | (2006.01) |
| *C01G 23/047* | (2006.01) |
| *C01G 23/08* | (2006.01) |
| *C01B 3/00* | (2006.01) |
| *C01B 6/02* | (2006.01) |

(Continued)

(52) U.S. Cl.
CPC .............. *C01G 23/003* (2013.01); *B32B 18/00* (2013.01); *B82Y 30/00* (2013.01); *C01B 3/0026* (2013.01); *C01B 3/0031* (2013.01); *C01B 6/02* (2013.01); *C01B 6/24* (2013.01); *C01D 13/00* (2013.01); *C01G 23/04* (2013.01); *C01G 23/047* (2013.01); *C01G 23/08* (2013.01); *B32B 2311/18* (2013.01); *B82Y 40/00* (2013.01); *C01P 2002/72* (2013.01); *C01P 2002/82* (2013.01); *C01P 2002/84* (2013.01); *C01P 2002/85* (2013.01); *C01P 2004/03* (2013.01); *C01P 2004/04* (2013.01); *C01P 2004/13* (2013.01); *C01P 2004/16* (2013.01); *C01P 2004/34* (2013.01); *C01P 2004/50* (2013.01); *C01P 2004/61* (2013.01); *C01P 2004/62* (2013.01); *C01P 2004/64* (2013.01); *Y02E 60/327* (2013.01); *Y10S 977/762* (2013.01); *Y10S 977/773* (2013.01); *Y10S 977/811* (2013.01); *Y10S 977/896* (2013.01); *Y10T 428/24058* (2015.01); *Y10T 428/298* (2015.01)

(58) Field of Classification Search
None
See application file for complete search history.

(56) References Cited

PUBLICATIONS

"The effect of hydrothermal conditions on the mesoporous structure of TiO2 nanotubes," Bavykin et al, Journal of Materials Chemistry, Sep. 2004, vol. 14, pp. 3,370-3,377.*

(Continued)

*Primary Examiner* — Colin W Slifka
(74) *Attorney, Agent, or Firm* — Hoffmann & Baron, LLP

(57) ABSTRACT

The invention relates to nanomaterials and assemblies including, a micrometer-scale spherical aggregate comprising: a plurality of one-dimensional nanostructures comprising titanium and oxygen, wherein the one-dimensional nanostructures radiate from a hollow central core thereby forming a spherical aggregate.

8 Claims, 23 Drawing Sheets

(51) Int. Cl.
*C01B 6/24* (2006.01)
*B82Y 30/00* (2011.01)
*B32B 18/00* (2006.01)
*B82Y 40/00* (2011.01)

(56) References Cited

PUBLICATIONS

"Phase Transition between Nanostructures of Titanate and Titanium Dioxides via Simple Wet-Chemical Reactions," Zhu et al, J.A.C.S., Apr. 2005, vol. 127, pp. 6,730-6,736.*
Son et al., "Cation Exchange Reactions in Ionic Nanocrystals;" Science 306:1009-1012; (Nov. 2004).
Armstrong et al, "TiO2-B Nanowires;" Angew. Chem. Int. Ed 43:2286-2288; (2004).
Zhu et al., "Phase Transition between Nanostructures of Titanate and Titanium Dioxides via Simple Wet-Chemical Reactions;" Journal of American Chemical Society 127:6730-6736; (2005).
Mao et al., "Synthesis and Growth Mechanism of Titanate and Titania One-Dimensional Nanostructures Self-Assembled into Hollow Micrometer-Scale Spherical Aggregates;" Journal of Physical Chem. 110:702-710; (2006).
Burda et al., "Chemistry and Properties of Nanocrystals of Different Shapes;" Chem. Rev.; 105:1025-1102; (Mar. 2005).
Hoffmann et al., "Environmental Applications of Semiconductor Photocatalysis;" Chem. Rev.; 95:69-96; (1995).
Li et al., "High Purity Anatase TiO2 Nanocrystals: Near Room-Temperature Synthesis, Grain Growth Kinetics, and Surface Hydration Chemistry;" Journal of American Chemical Society 127:8659-8666; (2005).
Zhang et al., "Preparing Single-Phase Nanocrystalline Anatase from Amorphous Titania with Particle Sizes Tailored by Temperature;" Nano Letters 1(2):81-85 (2001).
Yoshida et al., "Syntheses of TiO2(B) Nanowires and TiO2 Anatase Nanowires by Hydrothermal and Post-Heat Treatments;" Journal of Solid State Chemistry 178:2179-2185; (2005).
Feng et al., "Synthesis of Crystal-Axis-Oriented BaTiO3 and Anatase Platelike Particles by a Hydrothermal Soft Chemical Process;" Chem. Mater. 13:290-296; (2001).
Bavykin et al., "The Effect of Hydrothermal Conditions on the Mesoporous Structure of TiO2 Nanotubes;" Journal of Materials Chemistry 14:3370-3377; (2004).
Kasuga et al., "Titania Nanotubes Prepared by Chemical Processing;" Advanced Materials 11(15):1307-1311; (1999).
Ma et al., "Structural Features of Titanate Nanotubes/Nanobelts Revealed by Raman, X-Ray Absorption Fine Structure and Electron Diffraction Characterizations;" J. Phys. Chem. B. 109:6210-6214; (2005).
Masaki et al., "Characterization of a New Potassium Titanate, KTiO2(OH) Synthesized via Hydrothermal Method;" Chem. Mater. 14:419-424; (2002).
Wang et al., "Enhanced Catalytic Activity of Hemoglobin in Organic Solvents by Layered Titanate Immobilization;" Journal of American Chemical Society 126:14346-14347; (2004).
Varghese et al., "Extreme Changes in the Electrical Resistance of Titania Nanotubes with Hydrogen Exposure;" Advanced Materials 15(7-8):624-627; (2003).
Bryan et al., "Strong Room-Temperature Ferromagnetism in Co2+-Doped TiO2 Made from Colloidal Nanocrystals;" Journal of American Chemical Society 126:11640-11647; (2004).
Xu et al., "Growth and Mechanism of Titania Nanowires;" Solid State Communications 126:545-549; (2003).
Hodos et al., "Photosensitization of Ion-Exchangeable Titanate Nanotubes by CdS Nanoparticles;" Chemical Physics Letters 399:512-515; (2004).
Tian et al., "Large Oriented Arrays and Continuous Films of TiO2-Based Nanotubes;" Journal of American Chemical Society 125:12384-12385; (2003).
Jin-Ming Wu "Low-Temperature Preparation of Titania Nanorods through Direct Oxidation of Titanium with Hydrogen Peroxide;" Journal of Crystal Growth 269:347-355; (2004).

* cited by examiner

TITANATE AND TITANIA NANOSTRUCTURES AND NANOSTRUCTURE ASSEMBLIES, AND METHODS OF MAKING SAME

CROSS-REFERENCE TO RELATED APPLICATION

This application claims the benefit of U.S. Provisional Application No. 60/875,786, filed Dec. 18, 2006, which is incorporated herein by reference in its entirety.

This invention was made with support by the U.S. Department of Energy Office of Basic Energy Sciences under Contract DE-AC02-98CH10886, and the National Science Foundation (CAREER award DMR-0348239). The Government has certain rights in this invention.

BACKGROUND OF THE INVENTION

Nanoscale synthesis has traditionally relied on generating nanomaterials from bulk precursors using a number of excellent though imperfect approaches. For instance, various "top-down" strategies, such as milling, imprinting, or etching techniques, are limited with respect to the available geometries, shapes, and sizes of synthesizable nanomaterials that can be efficiently generated. (Mirkin et al., *MRS Bull.* 2001, 26, 506; Xia et al., *Adv. Mater.* 2003, 15, 353.) In addition, diverse "bottom-up" methodologies starting from either atomic or molecular precursors in the gaseous or solution phase often are unable to yield simultaneous control over nanoparticle structure, surface chemistry, monodispersity, crystal structure, and assembly. (Dloczik et al., *Nano Lett.* 2003, 3, 651; Patzke et al., *Angew. Chem., Int. Ed.* 2002, 41, 2446.)

It would be conceptually easier to control the chemical structure of matter at the nanometer scale if one were able to start with, transform, and subsequently manipulate nanoscale precursors to obtain the desired target materials. One exciting strategic approach aimed at fulfilling this objective is associated with the use of localized solid-state chemical transformations via the insertion (Cao et al., *J. Solid State Chem.* 2004, 177, 2205; Gates et al., *J. Am. Chem. Soc.* 2001, 123, 11500), exchange (Dloczik et al., *Nano Lett.* 2003, 3, 651; Son et al., *Science* 2004, 306, 1009), or deletions (Armstrong et al., *Angew. Chem.*, Int. Ed. 2004, 43, 2286; Zhu et al., *J. Am. Chem. Soc.* 2005, 127, 6730) of individual atoms. In other words, existing nanostructures serve as structural templates from which nanomaterials of a diverse nature and a complex composition, which may be difficult or otherwise impossible to synthesize, can be readily generated. Collectively, these types of reactions with minor alterations could be used to produce many technologically important, nanometer-scale crystalline materials, with a wide range of size- and shape-tunable properties. (Dloczik et al., *Nano Lett.* 2003, 3, 651; Cao et al., *J. Solid State Chem.* 2004, 177, 2205; Gates et al., *J. Am. Chem. Soc.* 2001, 123, 11500; Son et al., *Science* 2004, 306, 1009; Armstrong et al., *Angew. Chem.*, Int. Ed. 2004, 43, 2286; Zhu et al., *J. Am. Chem. Soc.* 2005, 127, 6730; Burda et al., *Chem. Rev.* 2005, 105, 1025.) The main point involved is that classes of new nanomaterials can be created through reasonably straightforward in situ localized structural transformations, which are often modifications of versatile bulk reactions.

As a model system to demonstrate this idea, nanocrystallites of $TiO_2$ (titania) are of great interest for photocatalysts, gas sensors, pigments, and photovoltaic applications, because of their electronic, optoelectronic, and catalytic properties, which are intrinsically coupled to their high surface area, porosity, low cost, and chemical stability. (Hoffmann et al., *Chem. Rev.* 1995, 95, 69.) Hence, it is not surprising that groups have been highly motivated to synthesize titania nanostructures by solution chemistry methods, involving either titanium sulfates, titanium tetrahalides, titanium alkoxides, or other organometallic titanium derivatives, under various experimental conditions, such as the presence of either acidic and alkaline media. (Hoffmann et al., *Chem. Rev.* 1995, 95, 69; Li et al., *J. Am. Chem. Soc.* 2005, 127, 8659; Zhang et al., *Nano Lett.* 2001, 1, 81.)

However, there is limited precedence for producing titania nanostructures from an existing nanoscale motif. For instance, $TiO_2(B)$ nanowires have been prepared by heating acid-washed titanate nanowires at 400° C. for 4 h in air; the titanates in that case were initially generated by adding anatase $TiO_2$ to a highly concentrated aqueous NaOH solution. (Armstrong et al., *Angew. Chem.*, Int. Ed. 2004, 43, 2286.) These $TiO_2(B)$ nanowires could be further transformed into their anatase one-dimensional (1-D) analogues as well as into rod-shaped rutile grains between 600 to 800° C. and at 900° C., respectively. (Yoshida et al., *Solid State Chem.* 2005, 178, 2179.) Platelike $BaTiO_3$ and anatase particles can be synthesized from an $H^+$-form of titanate (e.g., $H_{1.07}Ti_{1.73}O_4 \cdot nH_2O$) with a lepidocrocite-like layered structure using a hydrothermal soft chemical synthetic process. (Feng et al., *Chem. Mater.* 2001, 13, 290.) Titanate nanostructures can be converted into their anatase and rutile $TiO_2$ nanoparticle polymorphs in simple wet-chemical conditions in acidic aqueous dispersions. (Zhu et al., *J. Am. Chem. Soc.* 2005, 127, 6730.)

A recently reported study from the Alivisatos group aimed to rationally dictate the size and shape of the resultant nanoscale product in selenide nanocrystal systems. (Son et al., *Science* 2004, 306, 1009; Burda et al., *Chem. Rev.* 2005, 105, 1025.) However, before the present invention, rationally controlling the size and shape of resultant titania nanoscale products have not yet been reported.

Another relevant area of focus in nanotechnology involves the preparation of higher-order assemblies, arrays, and superlattices of various, individual nanostructures. The preparation of organized assemblies of inorganic materials has tended to rely on the use of organic ligands, additives, or templates. (Whitesides et al. *Science* 2002, 295, 2418; Bartl et al., *Acc. Chem. Res.* 2005, 38, 263; Park et al., *Science* 2004, 303, 348; Caruso, F. *Adv. Mater.* 2001, 13, 11; Colfen et al., *Angew. Chem.*, Int. Ed. 2003, 42, 2350; Sanchez et al., *Nat. Mater.* 2005, 4, 277.)

However, before the present invention, preparation of higher-order assemblies of titanate and titania nanostructures have not yet been provided, particularly, such preparation has not been achieved without the use of templates.

SUMMARY OF THE INVENTION

The present invention relates to titanate and titania nanostructures, and nanostructure and micrometer-scale assemblies.

Throughout this specification ratios of ingredients are recited. Such ratios are based on relative mass.

In one aspect of the invention, micrometer-scale spherical aggregates are provided. These aggregates comprise a plurality of one-dimensional nanostructures comprising titanium and oxygen, wherein the one-dimensional nanostructures radiate from a hollow central core thereby forming a spherical aggregate. Preferably, the aggregate exhibits substantially improved photocatalytic ability.

In one embodiment, the one-dimensional nanostructures of the aggregates comprise alkali metal hydrogen titanate.

Examples of the alkali metal hydrogen titanate include lithium hydrogen titanate, sodium hydrogen titanate, potassium hydrogen titanate, rubidium hydrogen titanate, cesium hydrogen titanate, and combinations thereof.

In another embodiment, the one-dimensional nanostructures of the aggregates comprise hydrogen titanate. The hydrogen titanate preferably has an orthorhombic lepidocrocite-type titanate structure.

In a further embodiment, the one-dimensional nanostructures of the aggregates comprise anatase titania.

The one-dimensional nanostructures of the aggregates are preferably nanotubes, nanowires, or a combination thereof.

Preferably, the diameter of the aggregate is about 0.1 µm to about 10 µm, or about 0.8 µm to about 1.2 µm. Preferably, the diameter of the interior core is about 10 nm to about 1 µm, or about 100 nm to about 200 nm. Preferably, the average diameter of the one-dimensional nanostructures is about 5 nm to about 100 nm, or about 5 nm to about 9 nm. Preferably, the average length of the one-dimensional nanostructures is about 10 nm to about 5 µm, or about 100 nm to about 900 nm.

In another aspect of the invention, methods of making micrometer-scale spherical aggregates are provided. These methods comprise mixing an alkali metal hydroxide solution, a peroxide solution and a titanium source to form a mixture; heating the mixture thereby forming a precipitate comprising the spherical aggregate, wherein the aggregate comprises a plurality of one-dimensional alkali metal hydrogen titanate nanostructures, and wherein the one-dimensional nanostructures radiate from a hollow central core thereby forming a spherical aggregate. Preferably, the mixture is heated to a temperature of about 50° C. to about 200° C.

In a preferred embodiment, the alkali metal hydroxide is lithium hydroxide, sodium hydroxide, potassium hydroxide, rubidium hydroxide, cesium hydroxide, or combinations thereof.

Preferably, the molarity of the alkali metal hydroxide solution is from about 1M to about 10M, wherein the peroxide solution is about 40% to about 60% peroxide, and wherein the ratio of alkali metal hydroxide solution:peroxide solution is about 1:1 to about 1000:1, about 25:1 to about 2:1, or about 10:1 to about 6:1.

Preferably, the titanium source is titanium foil or a liquid suspension (e.g., an aqueous suspension) of metallic titanium powder. An example of an aqueous suspension comprises about 20 wt % to about 80 wt % metallic titanium powder, wherein the ratio of alkali metal hydroxide:the aqueous suspension of metallic titanium powder is about 2:1 to about 50:1. Another example is an aqueous suspension comprising about 60 wt % to about 80 wt % metallic titanium powder, and wherein the ratio of alkali metal hydroxide:the aqueous suspension of metallic titanium powder is about 7.5:1 to about 50:1.

In another embodiment, the method further comprises neutralizing the precipitate thereby forming an aggregate comprising one-dimensional hydrogen titanate nanostructures.

In a further embodiment, the method further comprises annealing the hydrogen titanate nanostructure aggregate to form an aggregate comprising one-dimensional anatase titania nanostructures. Preferably, the hydrogen titanate nanostructure aggregate is heated to a temperature of about 350° C. to about 600° C. during annealing.

In another aspect of the invention, single crystalline anatase nanoparticles are provided, wherein the nanoparticles are at least 95% free of defects and/or dislocations and wherein the nanoparticles has less than about 0.1% impurities. Examples of the single crystalline anatase nanoparticles are nanocubes or rhombohedra. Preferably, the single crystalline anatase nanowire has a diameter of less than about 200 nm and the surface of the nanowire is substantially smooth.

In another aspect of the invention, pluralities of anatase nanocrystal aggregates are provided, wherein the nanocrystals are interconnected and aligned onto adjoining wire surfaces with substantially perfectly parallel lattice fringes.

In a further aspect of the invention, methods of making anatase nanomaterials are provided. The methods comprise (a) mixing titania powder and an alkali metal hydroxide solution to form a mixture; (b) heating the mixture thereby forming a precipitate comprising one-dimensional alkali metal hydrogen titanate nanomaterials, (c) neutralizing the alkali metal hydrogen titanate nanomaterials thereby forming hydrogen titanate nanomaterials; and (d) hydrothermally processing the formed hydrogen titanate nanomaterials thereby forming anatase nanomaterials.

Preferably, the hydrothermal process comprises dispersing the hydrogen titanate nanomaterials in water, and heating at about 100° C. to about 200° C.

Preferably, the ratio of the hydrogen titanate nanomaterials:water is about 2:1 to about 10:3.

Preferably, the temperature to which the mixture is heated in step (b) is about 100° C. to about 145° C., whereby the formed hydrogen titanate nanomaterials are at least 99% nanotubes.

Preferably, the temperature to which the mixture is heated in step (b) is about 150° C. to about 200° C., whereby the formed hydrogen titanate nanomaterials are at least 99% nanowires, wherein nanowires with diameters less than 200 nm are designated as small, and wherein nanowires with diameters of greater than about 200 nm are designated as large.

Preferably, the formed anatase nanomaterials are single crystalline anatase nanowires which are formed from the small hydrogen titanate nanowires.

Preferably, the formed anatase nanomaterials are anatase nanocrystal aggregates which are formed from the large hydrogen titanate nanowires.

The present invention overcomes the shortcomings in the prior art by controllably preparing titanate and titania products by simplistic one-pot assembly processes. The methods of the invention also allow for predictive formation of different size and shapes of the products. Moreover, the as-synthesized crystalline titanate and titania $TiO_2$ products are chemically pure, prepared without the use of either mineralizers or anionic additives.

Additionally, the methods of making three-dimensional (3D) assemblies of one-dimensional (1D) titanate and titania nanostructures do not require the use of sacrificial templates to render spatial confinement. Such templates tend to yield amorphous or semicrystalline products. Moreover, the methods are easily scaled up to achieve gram quantities of product in a simplistic manner without loss of morphological structure.

DETAILED DESCRIPTION OF THE INVENTION

Figure 1:
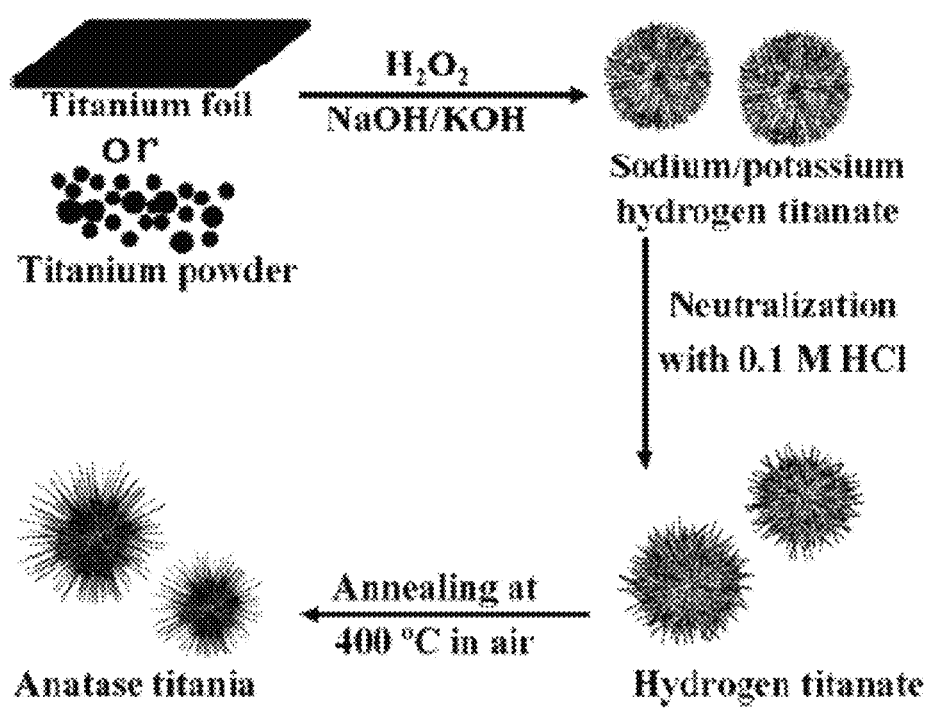
FIG. 1. Schematic illustration of the fabrication process for hollow micrometer-scale spherical assemblies of sodium/potassium hydrogen titanate, hydrogen titanate, and anatase $TiO_2$ 1D nanostructures, respectively, obtained from either Ti foil or powder upon reaction with $H_2O_2$ and either NaOH or KOH.

The present invention relates to nanostructures, such as nanotubes, nanowires and nanoparticles, and assemblies of nanostructures comprising titanium, and methods of making same.

Micrometer-Scale Spherical Aggregates Comprising Titanium

The present invention provides micrometer-scale spherical aggregates which comprise a plurality of densely packed, individually aligned, one-dimensional (1D) nanostructures comprising oxygen and titanium. The one-dimensional nanostructures radiate from a hollow central core thereby forming three-dimensional (3D) dendritic assemblies, i.e., the spherical aggregates. These aggregates have a sea-urchin-like shape.

The one-dimensional nanostructures of the aggregates are preferably nanotubes, nanowires, or combinations thereof. Examples of other suitable one-dimensional nanostructures are nanorods, nanobelts, nanocylinders and nanoparticles aggregates (e.g., individual nanoparticles strung together creating larger linear aggregate structures).

In one embodiment, the aggregate comprises one-dimensional nanostructures which consist essentially of alkali metal hydrogen titanate. The alkali metal hydrogen titanate is lithium hydrogen titanate, sodium hydrogen titanate, potassium hydrogen titanate, rubidium hydrogen titanate, cesium hydrogen titanate, or a combination thereof.

In another embodiment, the aggregate comprises one-dimensional nanostructures which consist essentially of hydrogen titanate. Preferably, the hydrogen titanate has an orthorhombic lepidocrocite-type titanate structure. Examples of other preferred structures include a monoclinic $H_2Ti_3O_7$ structure and an orthorhombic $H_2Ti_2O_5 \cdot H_2O$ structure.

In a further embodiment, the aggregate comprises one-dimensional nanostructures which consist essentially of anatase titania. Anatase titania can be converted into rutile titania and brookite titania by methods known in the art.

Typically, the diameter of an aggregate is about 0.1 µm to about 10 µm, more typically, about 0.8 µm to about 1.2 µm, or about 0.5 µm to about 1.5 µm. The alkali metal hydrogen titanate aggregates typically have a larger diameter than the hydrogen titanate aggregates which have a larger diameter than the anatase aggregates. Typically, the diameter of the central core of an aggregate is about 10 nm to about 1 µm, more typically, about 100 nm to about 200 nm.

Typically, the average diameter of the one-dimensional nanostructures in an aggregate is about 1 nm to about 100 nm or about 5 nm to about 100 nm, more typically, about 1 nm to about 20 nm or about 5 nm to about 9 nm. Typically, the average length of the one-dimensional nanostructures in an aggregate is about 10 nm to about 5 µm or 50 nm to about 5 µm, more typically, about 100 nm to about 900 nm.

Preferably, at least about 95%, at least 97%, or at least 99%, of the spherical aggregates consist of 1D nanostructures. The remaining percent of the aggregates could be attributed to an incomplete growth process.

These aggregates exhibit substantially improved photocatalytic behavior over current commercial structures. Typically, the aggregates have at least 30%, at least 40%, or at least 50% improved photocatalytic behavior vis-à-vis current commercial structures.

In another aspect of the present invention, methods of making the micrometer-scale spherical aggregates described above are provided.

In one embodiment, methods to make the alkali metal hydrogen titanate spherical aggregates are provided. The method comprises mixing an alkali metal hydroxide solution, an oxidizing agent solution, and a titanium source to form a mixture. Preferably, the alkali metal hydroxide solution and the oxidizing agent solution are mixed together first, and then the titanium source is subsequently added.

The alkali metal hydroxide is lithium hydroxide, sodium hydroxide, potassium hydroxide, rubidium hydroxide, cesium hydroxide, or combinations thereof. The molarity of the alkali metal hydroxide solution is preferably from about 1M to about 10M.

A preferred example of an oxidizing solution is a peroxide solution. Preferably, the peroxide solution is about 40% to about 60% peroxide, more preferably about 50% peroxide.

The ratio of alkali metal hydroxide solution:peroxide solution is about 1:1 to about 1000:1, or about 1:100 to about 1000:1. Preferably, the ratio of alkali metal hydroxide solution:peroxide solution is about 25:1 to about 2:1, or more preferably about 10:1 to about 6:1.

Examples of titanium sources include titanium foil, metallic titanium powder and a liquid suspension of metallic titanium powder (e.g., an aqueous suspension). Preferably, the aqueous suspension is about 20 wt % to about 80 wt % metallic titanium powder, more preferably, the aqueous suspension is about 40 wt % to about 80 wt % metallic titanium powder, or about 60 wt % to about 80 wt % metallic titanium powder.

Preferably, the ratio of alkali metal hydroxide:the aqueous suspension of metallic titanium powder is about 2:1 to about 50:1, more preferably, the ratio of alkali metal hydroxide:the aqueous suspension of metallic titanium powder is about 5:1 to about 40:1, or about 7.5:1 to about 40:1.

The mixture is then heated until a precipitate is formed. For example, the mixture is heated to a temperature of about 50° C. to about 200° C., or about 60° C. to about 125° C., for about 15 minutes to about 12 hours. The heating can take place in a sealed container, for example, an autoclave.

The precipitate comprises the alkali metal hydrogen titanate spherical aggregates.

In another embodiment of the present invention, the alkali metal hydrogen titanate spherical aggregates are transformed to hydrogen titanate spherical aggregates. In this embodiment, the precipitate is neutralized by methods known in the art. Typically, the precipitate is neutralized by contact with an acidic solution (e.g., hydrochloride acid, sulfate acid, nitrate acid, or a combination thereof) and subsequently washed with distilled, deionized water.

In a further embodiment of the present invention, the hydrogen titanate spherical aggregates are transformed into analogous anatase titania spherical aggregates. In this embodiment, the hydrogen titanate spherical aggregates are annealed. Annealing comprises heating to a temperature from about 250° C. to about 600° C., or from about 300° C. to about 600° C., more preferably, from about 350° C. to about 500° C., for about one to about ten hours. Annealing preferably takes place in air.

In another aspect of the invention, the anatase titania spherical aggregates are converted into rutile titania aggregates or brookite titania aggregates by methods known in the art.

The initial titanate structural motifs are unaffected by the subsequent chemical transformations. For example, the alkali metal hydrogen titanate aggregates, the hydrogen titanate aggregates, the anatase titania aggregates, the rutile titania aggregates and the brookite aggregates are unaffected by the subsequent chemical transformations, i.e., they have essentially the same basic topological morphology as their initial morphology.

The methods of the present invention are one-pot assembly processes and do not involve the use of sacrificial templates to render spatial confinement which tend to yield amorphous or semicrystalline products, and do not require surfactants. (Examples of templates include "track-etch" polymeric membranes; copolymer templates; Teflon membranes; zeolites, and porous alumina or silica membranes (including Anodisc membranes).)

Single Crystalline Nanomaterials Comprising Titanium Oxide

In another aspect, the present invention provides single crystalline anatase nanomaterials.

In one embodiment, the nanomaterials are single crystalline anatase nanoparticles, including nanocubes and rhombohedra. The sides of the nanocubes typically range from about 5 nm to about 50 nm, from about 8 nm to about 16 nm, from about 10 nm to about 14 nm, or from about 12 to about 13 nm. The rhombohedra of the present invention have a higher aspect ratio than nanocubes. In particular, the widths of the rhombohedra are about the same as the sides of the nanocubes. The lengths of the rhombohedra are about twice as long as their widths.

Examples of other nanoparticles of the invention include spheres, prisms, triangles and tetrapods.

In another embodiment, the nanomaterials are single crystalline anatase nanowires. The average diameters of the nanowires are less than about 200 nm, e.g., about 20 nm to about 200 nm. The surface of the nanowires is substantially smooth.

In a further embodiment, the present invention provides a plurality of anatase nanocrystal aggregates. In these aggregates, the nanocrystals are interconnected and aligned onto adjoining wire surfaces with substantially perfectly parallel lattice fringes. The average diameters of the aggregates are about 150 to about 500 nm. The average diameters of the nanocrystals are about 4 nm to about 200 nm.

The anatase nanomaterials of the invention are crystalline and solid. Preferably, the nanomaterials are at least 95% free, more preferably at least 99% free, and most preferably virtually completely free of defects and/or dislocations. As defined in this specification, defects are irregularities in the crystal lattice (i.e., intrinsic defects). Some examples of defects include a non-alignment of crystallites, an orientational disorder (e.g., of molecules or ions), vacant sites with the migrated atom at the surface (Schottky defect), vacant sites with an interstitial atom (Frenkel defects), point defects, grain boundary defects, and non-stoichiometry of the crystal. An example of a dislocation is a line defect in a crystal lattice.

The anatase nanomaterials of the invention can be converted to brookite and rutile nanomaterials as known in the art.

Additionally, the nanomaterials are preferably at least 95% free, more preferably at least 99% free, even more preferably at least 99.9% free, and most preferably virtually completely free of amorphous materials and/or impurities. Examples of amorphous materials include organic surfactant molecular groups, such as bis(2-ethylhexyl)sulphosuccinate, undecylic acid, sodium dodecyl sulfate (SDS), Triton X-100, decylamine, or double-hydrophilic block copolymers, which are present on the surfaces of prior art nanostructures. Examples of impurities include an element different from the elements of the crystalline structure and a vacancy.

In some embodiments of the invention, the outer surface of the nanomaterials contains amorphous carbon, with essentially little or no groups that are specifically oxygenated, e.g., COOH and OH. The presence of carbon as well as the absence of the surface oxygenated groups can be verified by IR spectroscopy, X-ray photoelectron spectroscopy or by using any other surface elemental analysis technique.

In another aspect of the present invention, methods of making the single crystalline anatase nanomaterials described above are provided.

The method comprises mixing titania powder and an alkali metal hydroxide solution to form a mixture. The ratio of the titania powder:alkali metal hydroxide is about 1:25 to about 1:250. The titania powder can be an anatase powder, rutile powder, brookite powder, or combinations thereof.

The alkali metal hydroxide is lithium hydroxide, sodium hydroxide, potassium hydroxide, rubidium hydroxide, cesium hydroxide, or combinations thereof. The molarity of the alkali metal hydroxide solution is preferably from about 1M to about 10M.

The mixture is then heated. In one embodiment, designated herein as "the low temperature embodiment," the mixture is heated from about 100° C. to about 145° C., or about 120° C. to about 135° C. In another embodiment, designated herein as "the high temperature embodiment," the mixture is heated from about 150° C. to about 200° C., or about 170° C. to about 190° C. Heating takes place for about 15 minutes to about 12 hours, or for about a week. The heating preferably takes place in a sealed container, for example, an autoclave.

Upon heating, a precipitate forms. The precipitate comprises one-dimensional alkali metal hydrogen titanate nanomaterials. The precipitate is neutralized using methods known in the art. Typically, the precipitate is neutralized by contacting with an acidic solution, such as 0.1M HCl solution and subsequently washing with distilled, deionized water. The ratio of the alkali metal hydrogen titanate nanomaterials: acidic solution is about 1:10 to about 1:40.

Upon neutralization, the alkali metal hydrogen titanate nanomaterials are transformed into hydrogen titanate nanomaterials. In the low temperature embodiment, the hydrogen titanate nanomaterials are at least about 90%, at least about 95%, at least about 99%, or 100% nanotubes. In the high temperature embodiment, the hydrogen titanate nanomaterials are at least about 95%, at least about 99%, or 100% nanowires. Nanowires with diameters less than 200 nm are designated as "small." Nanowires with diameters of greater than about 200 nm are designated as "large."

The hydrogen titanate nanomaterials are then hydrothermally processed to form anatase nanomaterials. The hydrothermal processing comprises dispersing the hydrogen titanate nanomaterials in water for about 0.5 to about 5 hours. The ratio of the hydrogen titanate nanomaterials:water is about 2:1 to about 10:3, or about 2:1 to about 10:1. Then the nanomaterials are heated at about 100° C. to about 200° C. for about 10 to about 36 hours. Preferably, heating takes place in a sealed container, such as an autoclave.

Upon hydrothermal processing, hydrogen titanate nanotubes (~7 to 10 nm) are transformed into high-purity, single-crystalline anatase nanoparticles. Small-diameter hydrogen titanate nanowires 200 nm) are converted into single-crystalline anatase nanowires with relatively smooth surfaces. Larger-diameter hydrogen titanate nanowires (~200 to 500 nm) are altered into anatase nanowires, resembling clusters of adjoining anatase nanocrystals with perfectly parallel, oriented fringes.

Thus, while there have been described what are presently believed to be the preferred embodiments of the present invention, other and further embodiments, modifications, and improvements will be known to those skilled in the art, and it is intended to include all such further embodiments, modifications, and improvements and come within the true scope of the claims as set forth below.

EXAMPLES

Micrometer-Scale Spherical Aggregate Comprising Titanium

The examples describe an in situ organization of either sodium or potassium hydrogen titanate one-dimensional (1D) nanostructures, measuring several hundreds of nanometers in length and up to several nanometers in diameter, into hollow micrometer-scale spherical aggregates or sea-urchin-like structures, under a variety of reaction conditions (including temperature variations). These hierarchical structures have been produced using a general redox strategy combined with a hydrothermal reaction involving a titanium source (e.g., either Ti foil or Ti powder), a basic NaOH or KOH solution, and an oxidizing $H_2O_2$ solution. Large quantities of discrete sea-urchin-like structures of both titanate and titania 1D nanostructures are generated in different reaction media, including in solution and on the surfaces of Ti reagent foils and powders.

Three-dimensional (3D) dendritic assemblies of (a) potassium hydrogen titanate, (b) sodium hydrogen titanate, (c) hydrogen titanate, and (d) anatase titania 1D nanostructures are generated in solution and on surfaces.

The one-pot assembly process does not involve the use of sacrificial templates to render spatial confinement which tend to yield amorphous or semicrystalline products. The initially formed assemblies of alkali metal hydrogen titanate 1D nanostructures can be subsequently transformed into their analogous anatase $TiO_2$ 1D nanostructures by annealing intermediate hydrogen titanate 1D nanostructures in air. Moreover, the protocol for the controlled synthesis of assemblies of 1D nanostructures of titanates and anatase can be easily scaled up to achieve gram quantities of product in a simplistic manner, without loss of structure. The detailed time-dependent investigation by scanning electron microscopy (SEM), inductively coupled plasma atomic emission spectrometry (ICP-AES), and atomic force microscopy (AFM) of the growth of these nanoscale materials demonstrates that the evolution of the initial hollow alkali metal hydrogen titanate micrometer-scale spheres involves a two-stage process.

Experimental Section

Preparation of Materials.

The synthesis and assembly of alkali metal hydrogen titanate 1D nanostructures were performed through a one-step approach. In a typical protocol, 16.5 mL of either a 1-10 M NaOH (to synthesize sodium hydrogen titanate) or KOH (to generate potassium hydrogen titanate) solution and 1.5 mL of 50% $H_2O_2$ solution were initially mixed into a 23 mL autoclave. Thereafter, either a 1×1 $cm^2$ titanium foil or a 0.5-2 mL aqueous suspension of metallic titanium powder (<20 μm, 93%, Alfa Aesar, 70 wt %) was subsequently added into the mixture. The autoclave was then sealed and heated in an oven at 60-200° C. for 0-12 h. A ubiquitous white precipitate, that was present in solution and which also covered the Ti foil surface when used in the experiment, was observed. Specifically, in the case of the Ti foil, its surface was repeatedly rinsed with deionized water and dried in air at room temperature prior to taking SEM images. Separately, the white precipitate collected from solution was then centrifuged and washed with distilled water until the pH value of the supernatant was close to 7.

The isolated wet precipitate was identified as consisting of hollow micrometer-scale spheres of either sodium or potassium hydrogen titanate 1D nanostructures, which could then be neutralized using approximately 15 mL of 0.1 M HCl solution and subsequently washed with distilled, deionized water to yield assemblies of hydrogen titanate 1D nanostructures. Corresponding assemblies of anatase $TiO_2$ 1D nanostructures were synthesized by annealing aggregates of hydrogen titanate 1D nanostructures in air at 350-500° C. for 1-10 h (FIG. 1).

Characterization.

As-prepared hollow micrometer-scale spheres of titanate and anatase 1D nanostructures were initially characterized by a number of methodologies, including X-ray diffraction (XRD), Raman spectroscopy, UV-vis spectroscopy, SEM, transmission electron microscopy (TEM), high-resolution transmission electron microscopy (HRTEM), selected area electron diffraction (SAED), and energy-dispersive X-ray spectroscopy (EDS).

XRD.

Crystallographic and purity information regarding hollow micrometer-scale spheres of titanate and $TiO_2$ 1D nanostructures were obtained using powder XRD. Diffraction patterns of titanate and anatase structures were collected using a Scintag diffractometer, operating in the Bragg configuration using Cu Kα radiation ($\lambda$=1.54 Å) from 5 to 60° at a scanning rate of 0.025° and 1° per min, respectively.

Optical Spectroscopy.

Raman spectra were acquired with a Raman microspectrometer (Renishaw 1000) using an Ar ion laser (514.5 nm). A 50× objective and low laser power density were chosen for irradiation of the sample and for signal collection. The laser power was kept low enough to avoid heating of the samples by optical filtering and/or defocusing of the laser beam at the sample surface. Spectra were collected in the range of 1000-50 $cm^{-1}$ with a resolution of 1 $cm^{-1}$. UV-vis spectra were obtained for hollow micrometer-scale spheres of titanate and titania 1D nanostructures, dispersed by sonication in distilled water to obtain homogeneous solutions, at high resolution on a Thermospectronics UV1 instrument using quartz cells with a 10-mm path length at a resolution of 1 nm. The UV-vis absorption spectra were recorded using distilled water as a blank.

Electron Microscopy.

The size, morphology, and chemical composition of as-prepared titanate and $TiO_2$ powder samples were analyzed by electron microscopy. For SEM, samples were mounted onto conductive carbon tapes, which were then attached onto the surfaces of SEM brass stubs and thereafter conductively coated with gold by sputtering for 20 s to minimize charging effects. SEM images were taken using a field-emission SEM (FE-SEM Leo 1550 with EDS capabilities), operating at accelerating voltages of 15 kV. Low-magnification TEM and HRTEM images and SAED patterns as well as EDS data were obtained on a JEOL 2010F HRTEM (equipped with an Oxford INCA EDS system) at an accelerating voltage of 200 kV to further characterize individual 1D nanostructures of titanate and of $TiO_2$. Specimens for these studies were prepared by depositing an aqueous drop of these samples onto a 300 mesh Cu grid. coated with a lacey carbon film. Prior to deposition, solutions containing samples of micrometer-scale spherical aggregates of titanate and 1D $TiO_2$ nanostructures were sonicated for 2 min to ensure adequate dispersion in solution.

To further probe the structural nature of the hierarchical structures in greater detail, micrometer-scale spheres of titanate and $TiO_2$ 1D nanostructures were physically microtomed and cross-sectioned for TEM analysis. For the preparation of these microtomed samples, dried products were initially dispersed in low-viscosity Spurr's epoxy (Polysciences, Warrington, Pa.), which was then polymerized at 70° C. for 24 h. An Ultracut microtome equipped with a diamond knife was subsequently used to slice the cured epoxy resin into slivers of ~70 nm in thickness. These slivers were placed onto carbon-coated Cu grids for TEM observation. TEM images of microtomed samples were taken at an accelerating voltage of 100 kV on a JEOL JEM1200ex instrument.

Growth Mechanism Studies.

The formation process of hollow micrometer-scale spherical aggregates of titanate 1D nanostructures was studied by monitoring (a) the time-dependent morphology and roughness change of a titanium foil surface and (b) the temporal progression and alteration in the atomic concentration of titanium in the reaction solution throughout the growth period of 6 h at 75° C. Because of the experimental convenience of sampling at lower temperatures, this specific reaction temperature was chosen from which to obtain mechanistic insights; the results though are equally valid for the slightly more crystalline products, formed at higher reaction temperatures (e.g., 130° C.). Similarly, for experimental ease, the morphology change of the surface white precipitate, generated in the presence of a titanium foil, was analyzed by FESEM. The roughness of the external surface of the titanium foil as a function of growth time was examined by AFM (Veeco Digital Instruments Multimode Nanoscope Isla, Santa Barbara, Calif.), operated in Tapping Mode using conventional silicon tips under ambient conditions. AFM height images were flattened and plane fitted, prior to roughness analysis. The average roughness value of the samples was extracted from AFM height images (10×10 $\mu m^2$ and 2×2 $\mu m^2$) using commercial DI software. Titanium concentrations of the reaction solution sampled at various time intervals were measured by ICP-AES (Perkin-Elmer Optima 3000).

Results

X-ray Analysis.

Figure 2:
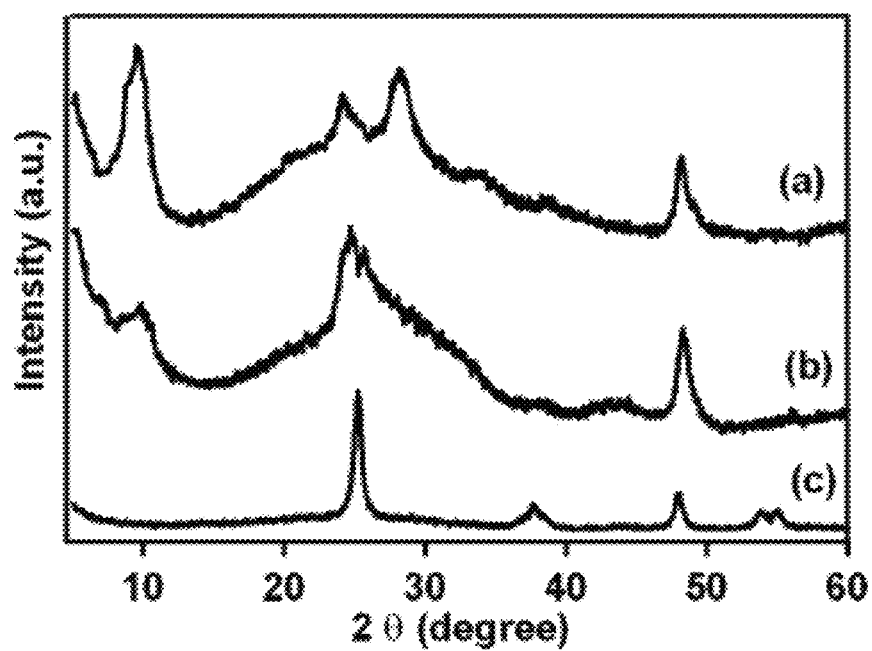
FIG. 2. XRD patterns arising from as-prepared powders of hollow micrometer-scale spherical assemblies of (a) sodium hydrogen titanate, (b) hydrogen titanate, and (c) anatase $TiO_2$ 1D nanostructures, respectively.

As-prepared solid samples of micrometer-scale aggregates of titanate and $TiO_2$ 1D nanostructures were examined by powder XRD measurements on a Scintag diffractometer with Cu Kα radiation (FIG. 2, SI, and S2). The XRD patterns (FIG. 2a and S2c) of an initial, as-prepared alkali metal hydrogen titanate sample obtained after washing with only water could be attributed to that of either sodium or potassium hydrogen titanate, depending on the starting reagent. Whereas prior studies (Chen et al., *Adv. Mater.* 2002, 14, 1208; Sun et al. *Chem.-Eur. J.* 2003, 9, 2229; and Ma et al., *Chem. Phys. Lett.* 2003, 380, 577) have attributed the identity of these initial solid samples to the formation of $H_2Ti_3O_7$, the present data suggest that this is not the case. In FIG. 2a and S2c, it is demonstrated that the XRD pattern actually contains peaks at 2θ values of 9.58°, 24.22°, 28.28°, and 48.22° which are not consistent with hydrogen titanate. Moreover, the expected presence of either sodium or potassium in the alkali metal titanate sample was clearly shown by associated EDS data (FIG. 5f and S3d).

It is noteworthy that the XRD pattern (FIG. 2b and S1b) of the sample subsequently obtained after neutralization with HCl was different from that of the as-prepared alkali metal titanate sample, initially obtained after washing with only water. This result implies the presence of a structural transformation from an alkali metal hydrogen titanate to a hydrogen titanate, as either the sodium or potassium ions are replaced by and exchanged with protons during the acid leaching and neutralization reaction step. Moreover, the XRD data, typically associated in the literature with the formation of hydrogen titanate ($H_2Ti_3O_7$), are not consistent either with the present as-obtained results or with data conventionally reported for ion-exchangeable trititanate nanotubes (Izawa et al., *J. Phys. Chem.* 1982, 86, 5023). In fact, the XRD pattern for $H_2Ti_3O_7$ is theoretically predicted to possess a very faint 001 peak (d=0.903 nm) at a 2θ value of 9.795° as compared with a very strong 100 peak (d=0.786 nm) at a 2θ value of 11.257°; the peak intensity of the latter should be approximately five times that of the former. The present results clearly show that the relative intensities among the various peaks do not evince this relative intensity dependence and are not consistent with the expected XRD pattern for $H_2Ti_3O_7$.

In fact, a peak in the present data for the hollow micrometer-scale spherical aggregates of hydrogen titanate 1D nanostructures could more plausibly be ascribed to the 020 peak, observed at d=0.920 nm; that assignment is consistent with the 020 peak, expected at d=0.926 nm, for a lepidocrocite ($H_xTi_{2-x/4}\square_{x/4}O_4$ (x~0.7, $\square$: vacancy)) titanate structure at a 2θ value of ~9.6°. Indeed, other peaks in the XRD pattern of the present hydrogen titanate nanostructures located at 2θ values of 24.7°, 28.02°, and 48.22° can be ascribed to the 110, 130, and 200 peaks, respectively, of lepidocrocite titanate, as summarized in Table 1. Footnote 1 in Table 1 references Izawa et al., *J Phys. Chem.* 86:5023 (1982). Footnote 2 in Table 1 references Ma et al., *Chem. Phys. Lett.* 380:577 (2003). Hence, it is hypothesized that the present as-prepared assemblies of hydrogen titanate 1D nanostructures actually maintain an orthorhombic lepidocrocite-type ($H_xTi_{2-x/4}\square_{x/4}O_4$ (x~0.7, $\square$: vacancy)) titanate structure (Table 1). (Ma et al., *J. Phys. Chem. B* 2005, 109, 6210; Ma et al., *Chem. Phys. Lett.* 2003, 380, 577; and Sasaki et al., *Chem. Mater.* 1997, 9, 602.)

As previously mentioned, the corresponding 3D assemblies of anatase $TiO_2$ 1D nanostructures (FIG. 2c) were synthesized by a dehydration process, involving annealing of assemblies of hydrogen titanate 1D nanostructures in air at 350-500° C. for 1-10 h. All the diffraction peaks of the net product in FIG. 2c could be indexed to a pure hexagonal anatase phase of $TiO_2$, with calculated cell constants of a=b=3.785 Å and c=9.514 Å. The peak intensities and positions of the peaks are in good agreement with expected literature values (JCPDS File No. 21-1272), as shown in Table 2. Footnote 3 in Table 2 references Bryan et al., *J Am. Chem. Soc.* 126:11640 (2004). Indeed, 2θ values of 25.2°, 37.78°, 48.04°, 53.92°, and 55.1° could be ascribed to the expected 101, 004, 200, 105, and 211 peaks, respectively, of anatase titania. No peaks of the rutile or brookite phase were detected, indicating the high purity of the product.

Moreover, one can clearly observe the presence of an amorphous phase in the sample of either sodium or potassium hydrogen titanate as well as of hydrogen titanate, due to the noticeable background in the powder XRD patterns of these intermediate materials (parts a and b of FIG. 2 and SI). It is noteworthy that the amorphous phase, however, had almost completely crystallized after treatment at 400° C. for 5 h to form anatase $TiO_2$ (FIG. 2c).

Raman Analysis.

Figure 3:
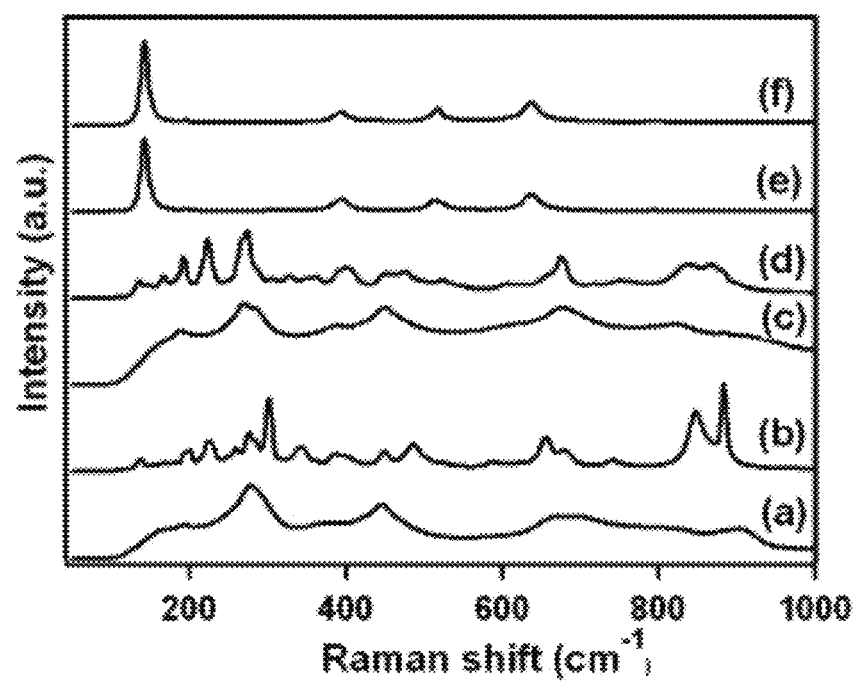
FIG. 3. Raman spectra of (a) as-prepared powders of hollow micrometer-scale spherical assemblies of sodium hydrogen titanate 1D nanostructures, (b) bulk commercial $Na_2Ti_3O_7$ powder, (c) as-prepared powders of hollow micrometer-scale spherical assemblies of hydrogen titanate 1D nanostructures, (d) bulk $H_2Ti_3O_7$ powder derived from a commercial source, (e) as-prepared powders of hollow micrometer-scale spherical assemblies of anatase $TiO_2$ 1D nanostructures, and (1) bulk commercial anatase $TiO_2$ powder, respectively.

Raman spectra of as-prepared hollow micrometer-scale spheres of 1D titanate nanostructures are shown in parts a and c of FIG. 3. Very broad bands are observed near 195, 280, 450, 640, and 920 cm$^{-1}$. Specifically, the profile in FIG. 3c shows very similar peak positions to expected values for protonic lepidocrocite titanate. (Ma et al., *J. Phys. Chem. B* 2005, 109, 6210 and Sasaki et al., *Chem. Mater.* 1997, 9, 602.) As a means of comparison with the present experimental results, the spectra of commercial bulk $Na_2Ti_3O_7$ (Aldrich) and of bulk $H_2Ti_3O_7$ (obtained by neutralization of commercial bulk $Na_2Ti_3O_7$) are shown as spectra in parts b and d of FIG. 3, respectively. It is evident that in the spectra of these bulk $Na_2Ti_3O_7$ and $H_2Ti_3O_7$ samples, there is an abundance of sharp peaks in the lower wavenumber regime located between 100 and 400 cm$^{-1}$ and that there are strong, characteristic peaks near ~850 cm$^{-1}$ (Sasaki et al., *Chem. Mater.* 1997, 9, 602 and Bamberger et al. *J. Am. Ceram. Soc.* 1987, 70, C-48.) These signals are conspicuously absent from the spectra of the present as-prepared hollow micrometer-scale spherical assemblies of titanate 1D nanostructures. Therefore, it is more reasonable, based on the correlations made in Table 3, to assign the optical modes of the present as-prepared hollow micrometer-scale spherical assemblies of hydrogen titanate 1D nanostructures to those associated with protonic lepidocrocite titanate ($H_xTi_{2-x/4}\square_{x/4}O_4$ (x~0.7, $\square$: vacancy)) sheets. This conclusion is consistent with the XRD data, discussed above (FIG. 2b and Sib). The sole caveat is that, because there are few reports directly relating observed Raman peaks to specific active modes of layered titanates, the exact assignment of the bands in the Raman spectra may not be fully accurate. Finally, the Raman spectrum (FIG. 3e) of as-prepared hollow micrometer-scale spherical aggregates of titania 1D nanostructures is associated with bands at 147, 198, 398, 515, and 640 cm$^{-1}$, which have been assigned to five Raman-active modes of the anatase phase of $TiO_2$ (Table 3), (Sasaki et al, *Chem. Mater.* 1997, 9, 602; Gao et al., *J. Phys. Chem. B* 2004, 108, 2868; and Busca et al., *J. Chem. Soc., Faraday Trans.* 1994, 90, 3181) and correlate well with the signal from the bulk anatase $TiO_2$ powder (FIG. 3f). Footnote 4 in Table 3 references Ma et al., *J Phys. Chem. B* 109:6210 (2005). Footnote 5 in Table 3 references Busca et al., *J. Chem. Soc., Faraday Trans.,* 90:3181 (1994).

UV-Vis Analysis.

Figure 4:
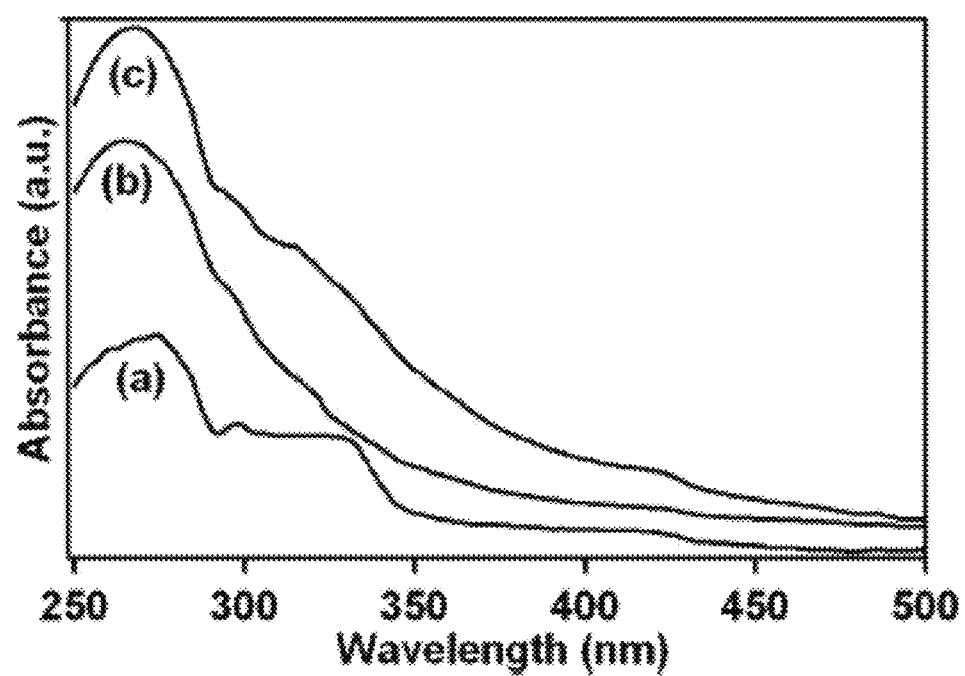
FIG. 4. UV-vis spectra of as-prepared powders of hollow micrometer-scale spherical assemblies of 1D nanostructures of (a) sodium hydrogen titanate, (b) hydrogen titanate, and (c) anatase $TiO_2$, respectively.

UV-vis spectra of the present as-prepared hollow micrometer-scale spherical assemblies of titanate and titania 1D nanostructures are shown in FIG. 4. The sodium hydrogen titanate sample shows two absorption edges (FIG. 4a). There is no conclusive explanation as to the physical origin of these peaks. Nonetheless, the present observations are in agreement with previously reported data from other groups. Specifically, the absorption peaks from the micrometer-scale spherical assemblies of hydrogen titanate and anatase titania 1D nanostructures (parts b and c of FIG. 4) suggest that they are wide band gap semiconductors, a conclusion which is consistent with previous reports.

SEM Observations.

Figure 5:
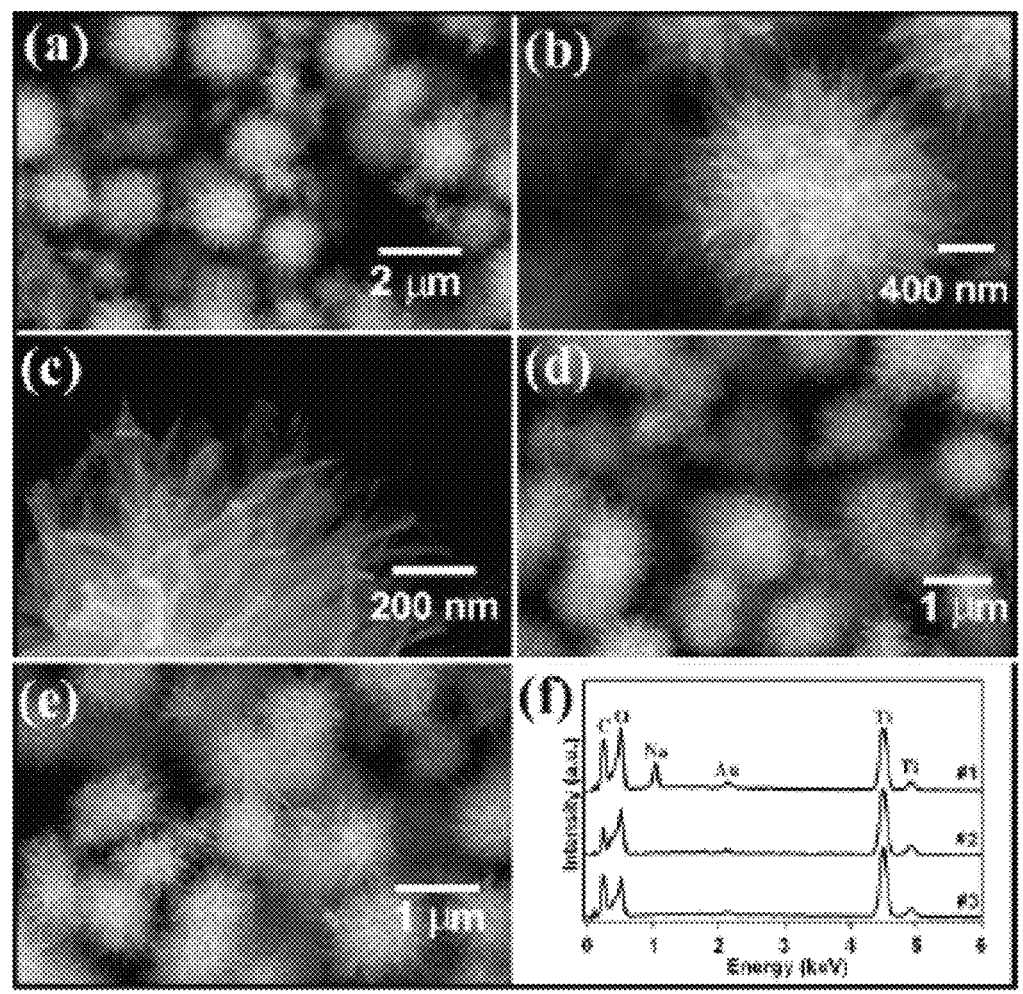
FIG. 5A. Typical SEM micrographs of as-prepared powders of hollow micrometer-scale spherical assemblies of 1D nanostructures of sodium hydrogen titanate.
FIG. 5B. Typical SEM micrographs of as-prepared powders of hollow micrometer-scale spherical assemblies of 1D nanostructures of sodium hydrogen titanate.
FIG. 5C. Typical SEM micrographs of as-prepared powders of hollow micrometer-scale spherical assemblies of 1D nanostructures of sodium hydrogen titanate.
FIG. 5D. Images of micrometer-scale spherical assemblies of hydrogen titanate 1D nanostructures.
FIG. 5E. Images of micrometer-scale spherical assemblies of anatase $TiO_2$ 1D nanostructures.
FIG. 5F. EDS data of as-prepared powders of hollow micrometer-scale spherical assemblies of 1D nanostructures: (1) sodium hydrogen titanate, (2) hydrogen titanate, and (3) anatase $TiO_2$, respectively. Small Au peaks in the EDS spectra originate from the gold coating used to eliminate charging effects prior to SEM imaging, with the C peaks arising from the underlying conductive carbon tape.

Typical SEM images of aggregates of hollow micrometer-scale spherical assemblies of titanate and $TiO_2$ 1D nanostructures are shown in FIG. 5 in addition to Figures S3 and S4. On the basis of these data, it can be observed that the 1D nanostructures of (a) sodium hydrogen titanate, (b) potassium hydrogen titanate, (c) hydrogen titanate, and (d) anatase $TiO_2$ self-organize into hollow spherical assemblies, which had never been previously observed for these classes of materials. Under the reported synthesis conditions, in terms of morphology, 95% of the samples isolated consisted of 3D hierarchical, micrometer-scale, spherical-like aggregates of densely packed 1D nanostructures of both titanates and $TiO_2$, with average diameters for the assemblies ranging from 0.8 to 1.2 um. The structural features of the remaining 5% of samples could be attributed to an incomplete growth process. It is interesting to note that the product titania and the series of intermediate titanate samples retained essentially the same basic topological morphology, even after intervening chemical processing steps, such as acid washing and moderate high-temperature annealing. This observation suggests that the initial titanate structural motifs (parts a-c of FIG. 5) observed were unaffected by the subsequent chemical transformations carried out (parts d and e of FIG. 5).

EDS analyses (FIG. 5f and S3d) also showed that the hollow micrometer-scale spherical assemblies of sodium hydrogen titanate, potassium hydrogen titanate, hydrogen titanate, and anatase $TiO_2$ 1D nanostructures were chemically composed of Na/Ti/O, K/Ti/O, Ti/O, and Ti/O elements, respectively, as expected. Neither sodium nor other extraneous elements were observed either for the orthorhombic lepidocrocite-type hydrogen titanate ($H_xTi_{2-x/4}\square_{x/4}O_4$ (x~0.7, $\square$: vacancy)) intermediate or for the final anatase titania product.

TEM/HRTEM Observation.

Figure 6:
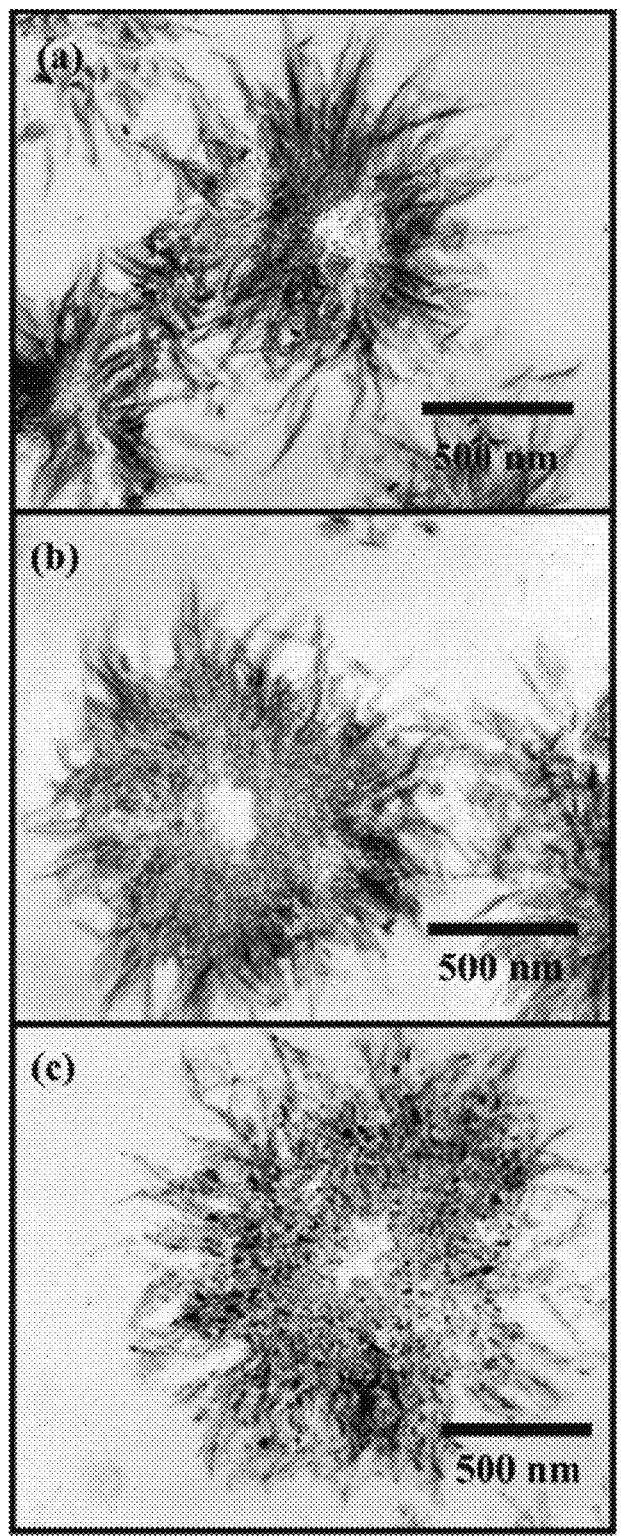
FIG. 6A. General cross-sectional TEM images of individual agglomerates that were taken from microtomed samples of as-prepared powders of hollow micrometer-scale spherical assemblies of 1D nanostructures of sodium hydrogen titanate.
FIG. 6B. General cross-sectional TEM images of individual agglomerates that were taken from microtomed samples of as-prepared powders of hollow micrometer-scale spherical assemblies of 1D nanostructures of hydrogen titanate.
FIG. 6C. General cross-sectional TEM images of individual agglomerates that were taken from microtomed samples of as-prepared powders of hollow micrometer-scale spherical assemblies of 1D nanostructures of anatase $TiO_2$.

To probe the interior of these 3D structures in greater detail, isolated titanate and titania agglomerates were microtomed and analyzed for their cross-sections by means of TEM (FIG. 6). It is evident that these 3D assemblies consist of individually aligned 1D nanostructures, tightly bundled perpendicularly to a central vacuous core. In many respects, these 1D nanostructures are analogous to the spokes of a wheel. In fact, these nanostructures covered the outer surface of the 3D agglomerates to a thickness of 400 nm, while the interior of these aggregates were hollow with a diameter range of 100-200 nm, resembling the microscopic variant of a sea urchin with spines.

Figure 8:
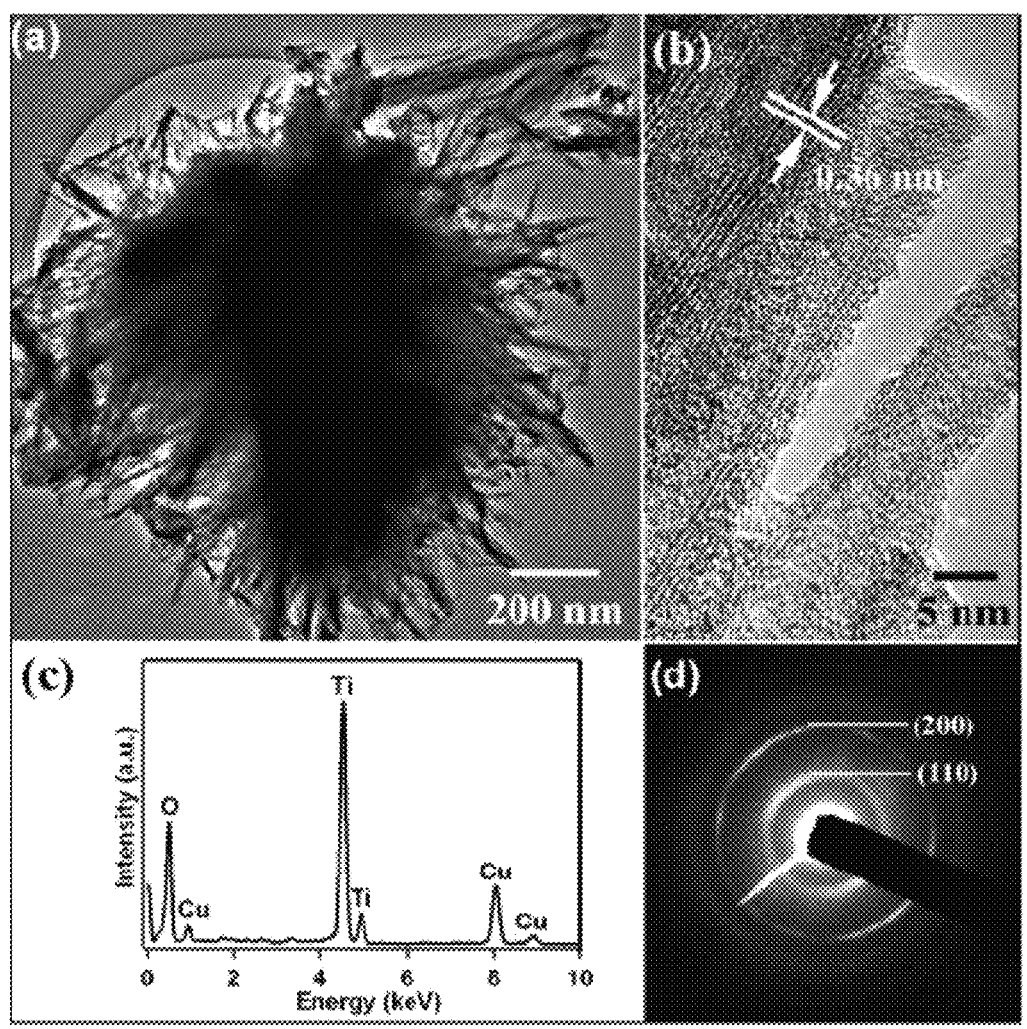
FIG. 8A. Representative low magnification TEM image of a single 3D hollow micrometer-scale spherical assembly of hydrogen titanate 1D nanostructures.
FIG. 8B. HRTEM image obtained from the ends of a few individual hydrogen titanate 1D nanostructures.
FIG. 8C. EDS data associated with an individual hollow micrometer-scale spherical assembly of hydrogen titanate 1D nanostructures shown in FIG. 8A. The Cu signals originate from the TEM grid.
FIG. 8D. A typical SAED pattern associated with an individual hollow micrometer-scale spherical assembly of hydrogen titanate 1D nanostructures shown in FIG. 8A.
Figure 9:
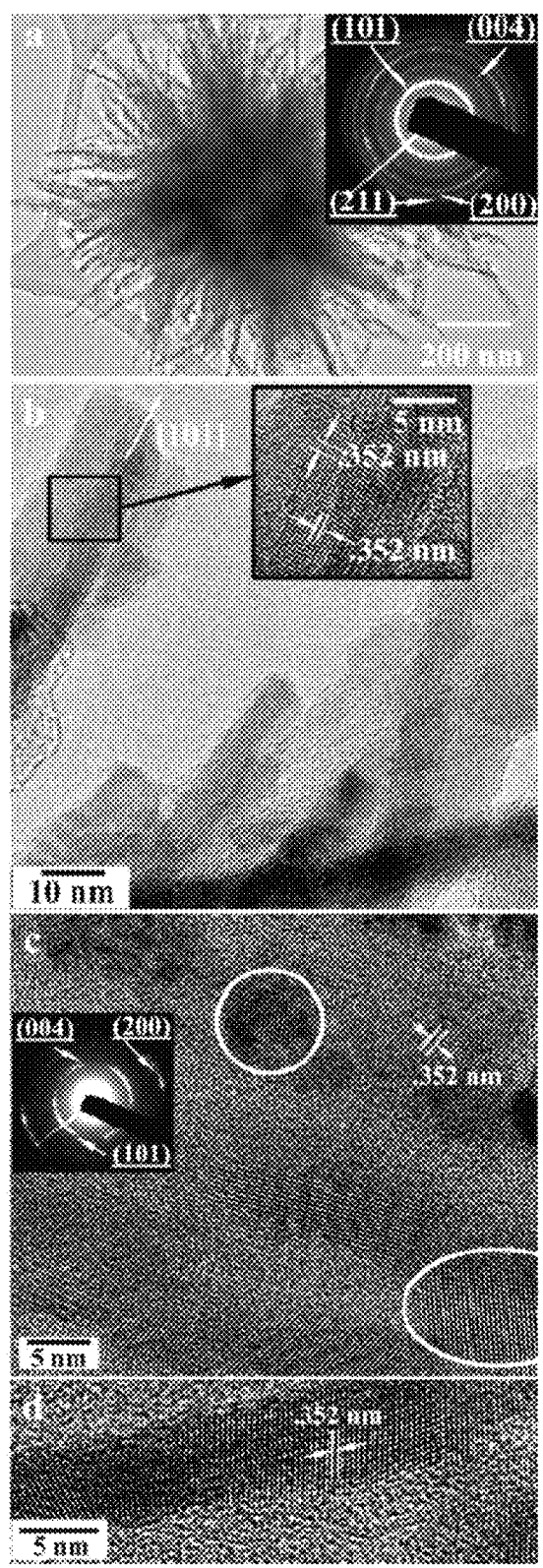
FIG. 9A. A general, low magnification TEM image of an individual micrometer-scale 3D spherical assembly of $TiO_2$ 1D nanostructures as well as the corresponding SAED pattern.
FIG. 9B. HRTEM image taken from the ends of a few $TiO_2$ 1D nanostructures shown in FIG. 9A. The inset shows an enlarged portion of a cluster of individual $TiO_2$ 1D nanostructures (e.g., nanowires in this case), as delineated by the black square.
FIG. 9C. Typical HRTEM image and corresponding SAED pattern of microtomed samples of hollow micrometer-scale assemblies of $TiO_2$ 1D nanostructures.
FIG. 9D. HRTEM image obtained from individual microtomed $TiO_2$ 1D nanostructures.

Additional higher-resolution TEM data (FIGS. 7-9 and S5) generally show that the constituent components of the aggregated structures, that is, the 1D nanostructures in question, are single-crystalline in nature with the presence of surface amorphous layers. Moreover, potassium hydrogen titanate, sodium hydrogen titanate, hydrogen titanate, and anatase $TiO_2$ 1D nanostructures consistently possessed a diameter range of 7±2 nm with lengths of up to several hundred nanometers. These results provide for strong, corroborating evidence that the chemical reaction sequence had little if any impact on the physical dimensions of the 3D structural motifs. Furthermore, although these titania and titanate 1D nanostructures overall appear to be loosely attached to each other, brief sonication for up to 1 h could not visibly disrupt these assemblies, implying that the interactions among the constituent 1D nanostructures were particularly strong.

Figure 7:
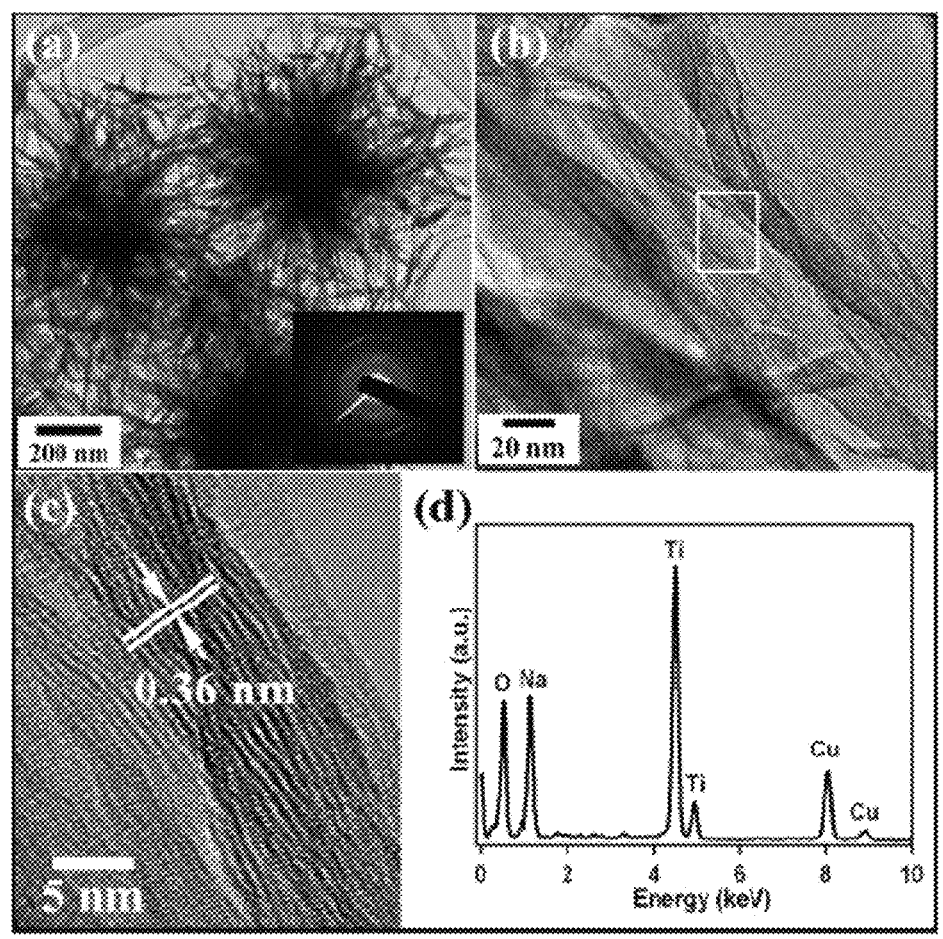
FIG. 7A. Typical TEM image of as-prepared 3D hierarchical, micrometer-scale assemblies of sodium hydrogen titanate 1D nanostructures, prepared from metallic Ti powder in the presence of NaOH and 50% $H_2O_2$. The inset shows the corresponding ED pattern.
FIG. 7B. Typical HRTEM image of as-prepared 3D hierarchical, micrometer-scale assemblies of sodium hydrogen titanate 1D nanostructures, prepared from metallic Ti powder in the presence of NaOH and 50% $H_2O_2$.
FIG. 7C. An enlarged portion of a cluster of 1D nanostructures, as delineated by the white square in FIG. 7B.
FIG. 7D. EDS spectra obtained from an individual hollow 3D micrometer-scale spherical assembly of sodium hydrogen titanate 1D nanostructures shown in FIG. 7A. The Cu peaks originate from the TEM grid.

FIG. 7a and S5a show general, low magnification TEM images of individual micrometer-sized spherical aggregates of sodium hydrogen titanate and potassium hydrogen titanate 1D nanostructures, respectively. The inset of FIG. 7a yields an electron diffraction pattern of sodium hydrogen titanate. Parts b and c of FIG. 7 and S5 illustrate HRTEM images recorded from a number of individual sodium hydrogen titanate and potassium hydrogen titanate 1D nanostructures emanating from the sea-urchin-like, micrometer-scale assembly, shown in FIG. 7a and S5a, respectively. A 0.36-nm lattice spacing, measured perpendicularly to the long axis of the 1D nanostructures analyzed (FIG. 7c and S5c), was observed. EDS analysis (FIG. 7d) also showed that the micrometer-scale spherical assemblies of sodium hydrogen titanate 1D nanostructures were elementally composed of sodium, titanium, and oxygen, as expected, and that no other elements were noted.

FIG. 8a shows the corresponding general, low magnification TEM image of an individual hollow micrometer-sized spherical assembly of hydrogen titanate 1D nanostructures. On the basis of Raman and XRD data discussed previously, this structure is composed of an aggregate of protonic lepidocrocite ($H_xTi_{2-x/4}\square_{x/4}O_4$ (x~0.7, $\square$: vacancy)) titanate 1D nanostructures. FIG. 8b presents a HRTEM image recorded from the ends of a number of single, individual lepidocrocite titanate 1D nanostructures, originating from the sea-urchin-like, hollow micrometer-scale assembly, shown in FIG. 8a. These images suggest that the constituent component lepidocrocite titanate 1D nanostructures are composed of nanowires and nanotubes. A 0.36-nm lattice spacing between the (110) planes was observed, indicating that the 1D nanostructures similarly possess a [110] orientation. EDS analysis (FIG. 8c) also revealed that the hollow micrometer-scale spherical aggregates of hydrogen titanate 1D nanostructures were elementally composed of titanium and oxygen, as expected, and that neither sodium nor other extraneous elements were observed. FIG. 8d illustrates a SAED pattern, with the two rings observed, noted to be consistent with results expected for the (110) and (200) diffraction planes, respectively, of the orthorhombic structure of protonic lepidocrocite titanate ($H_xTi_{2-x/4}\square_{x/4}O_4$ (x~0.7, $\square$: vacancy)).

Finally, FIG. 9a shows a general, low magnification TEM image of an individual hollow micrometer-scale spherical aggregate, composed of anatase $TiO_2$ 1D nanostructure products. The inset of FIG. 9a yields a SAED pattern, with the four rings indexed to the (101), (200), (004), and (211) diffraction planes, respectively, of the hexagonal structure of anatase titania. FIG. 9b shows a HRTEM image recorded from the ends of a number of single anatase $TiO_2$ 1D nanostructures derived from the sea-urchin-like assembly, shown in FIG. 9a. The inset of FIG. 9b illustrates an enlarged section of the HRTEM image, delineated by the black square. In addition, a 0.352-nm lattice spacing between the (101) planes was observed, indicating that the $TiO_2$ 1D nanostructures possess a [101] orientation.

FIG. 9c shows a typical HRTEM image of a microtomed sample obtained from a hollow micrometer-scale spherical aggregate of anatase $TiO_2$ 1D nanostructures. Dependent on the orientation of the $TiO_2$ 1D nanostructures with respect to the direction of the microtome cut, different lattice planes from discrete $TiO_2$ nanostructures can be clearly observed. The area delineated by the parallel linear marking shows a lattice spacing between the (101) planes, measuring 0.352 nm. The sector traced out by the solid circle suggests that the individual $TiO_2$ 1D nanostructures are composed of $TiO_2$ nanowires with a diameter of about 6 nm. The elliptical area at the lower right-hand corner of the image implies that the $TiO_2$ nanowire was sliced at an angle. The inset shows a SAED pattern, with three rings observed, indexed to the expected (101), (200), and (004) diffraction planes, respectively, of anatase titania.

FIG. 9d illustrates a HRTEM image recorded from the ends of single $TiO_2$ nanowires, indicating that the nanowire grew along the [101] direction. The lattice spacing between the (101) planes (i.e., 0.352 nm) is also in agreement with that of the bulk crystal data. On the basis of these collective data, it is seen that individual $TiO_2$ 1D nanostructures synthesized using this method are hexagonal and single crystalline, with a structure similar to that of the bulk anatase titania solid. This assertion is in agreement with the XRD (FIG. 2c) and Raman (FIG. 3e) data, previously discussed, which were taken from a collection of hollow 3D micrometer-scale spherical assemblies of aggregated $TiO_2$ 1D nanostructures.

Growth Mechanism.

There have been a large number of aesthetically pleasing, spontaneously formed examples of crystalline supramolecular assemblies, which have arisen either from the intrinsic packing characteristics of molecules or from the interplay of subtle interactions involving external energy and mass transport considerations.

In the present experiment, to investigate the growth mechanism of hollow micrometer-scale spheres of titanate 1D nanostructures, the corresponding time-dependent evolution of 3D hierarchical crystal morphology and of the surface roughness of the foil and of the powder surface in the presence of NaOH and $H_2O_2$ were recorded by SEM (FIG. 10 and S6) and AFM (FIG. 11), respectively, over a reaction course of 360 min at 75° C. These reaction conditions were chosen due to ease of sampling. Since effectively identical samples have been obtained at temperatures ranging between 60 and 200° C., it is believed that the growth mechanism is temperature-independent. The temporal evolution of titanium concentration in a 3 mL reaction solution was also monitored by ICP-AES over the identical time period (FIG. 12).

Figure 10:
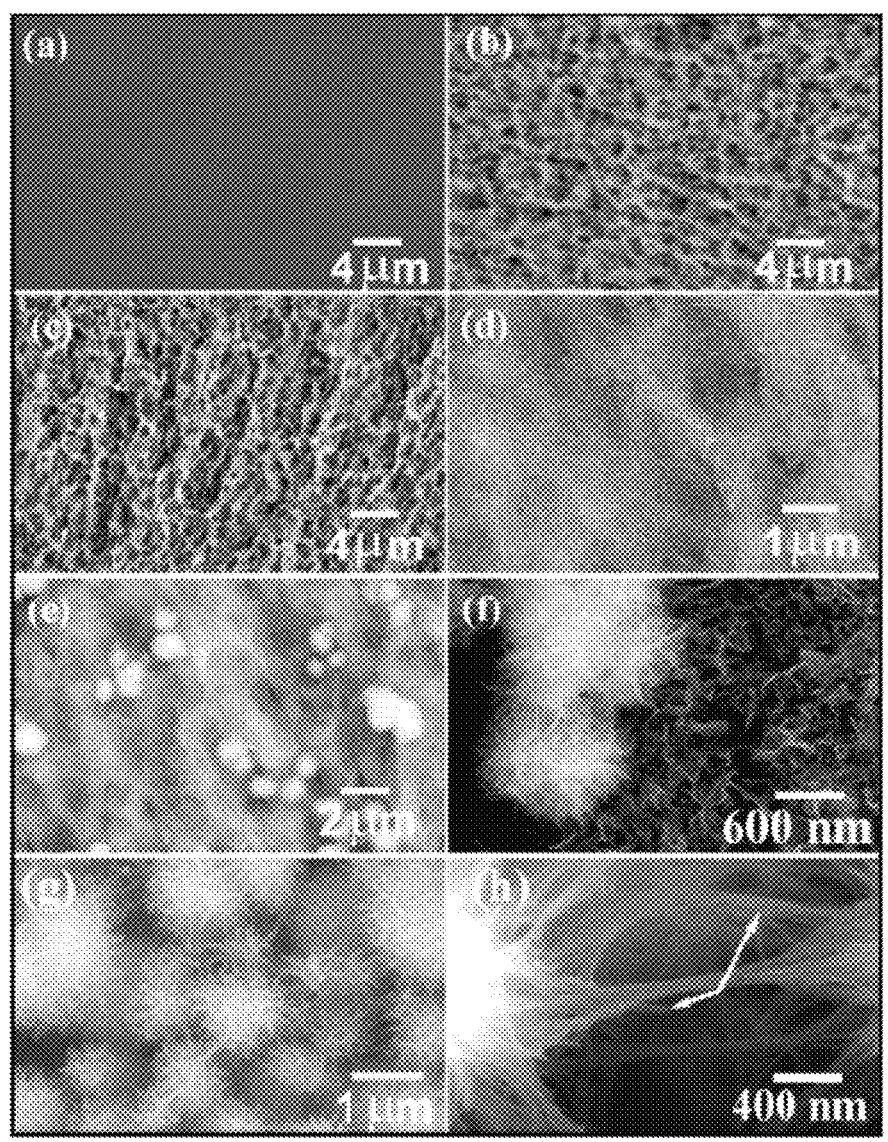
FIG. 10A. SEM images taken from the surface of the titanium foil after 0 min reaction time under hydrothermal conditions at 75° C. in the presence of 1 M NaOH, 50% $H_2O_2$, and Ti foil.
FIG. 10B. SEM image taken from the surface of the titanium foil after 40 min reaction time under hydrothermal conditions at 75° C. in the presence of 1 M NaOH, 50% $H_2O_2$, and Ti foil.
FIG. 10C. SEM image taken from the surface of the titanium foil after 1 h reaction time under hydrothermal conditions at 75° C. in the presence of 1 M NaOH, 50% $H_2O_2$, and Ti foil.
FIG. 10D. SEM image taken from the surface of the titanium foil after 2 h reaction time under hydrothermal conditions at 75° C. in the presence of 1 M NaOH, 50% $H_2O_2$, and Ti foil.
FIG. 10E. SEM image taken from the surface of the titanium foil after 3 h reaction time under hydrothermal conditions at 75° C. in the presence of 1 M NaOH, 50% $H_2O_2$, and Ti foil.
FIG. 10F. SEM image taken from the surface of the titanium foil after 3 h reaction time under hydrothermal conditions at 75° C. in the presence of 1 M NaOH, 50% $H_2O_2$, and Ti foil.
FIG. 10G. SEM image taken from the surface of the titanium foil after 4 h reaction time under hydrothermal conditions at 75° C. in the presence of 1 M NaOH, 50% $H_2O_2$, and Ti foil.
FIG. 10H. SEM image taken from the surface of the titanium foil after 4 h reaction time under hydrothermal conditions at 75° C. in the presence of 1 M NaOH, 50% $H_2O_2$, and Ti foil. White arrows denote localized fracturing of individual sodium hydrogen titanate nanostructure interfaces.
Figure 11:
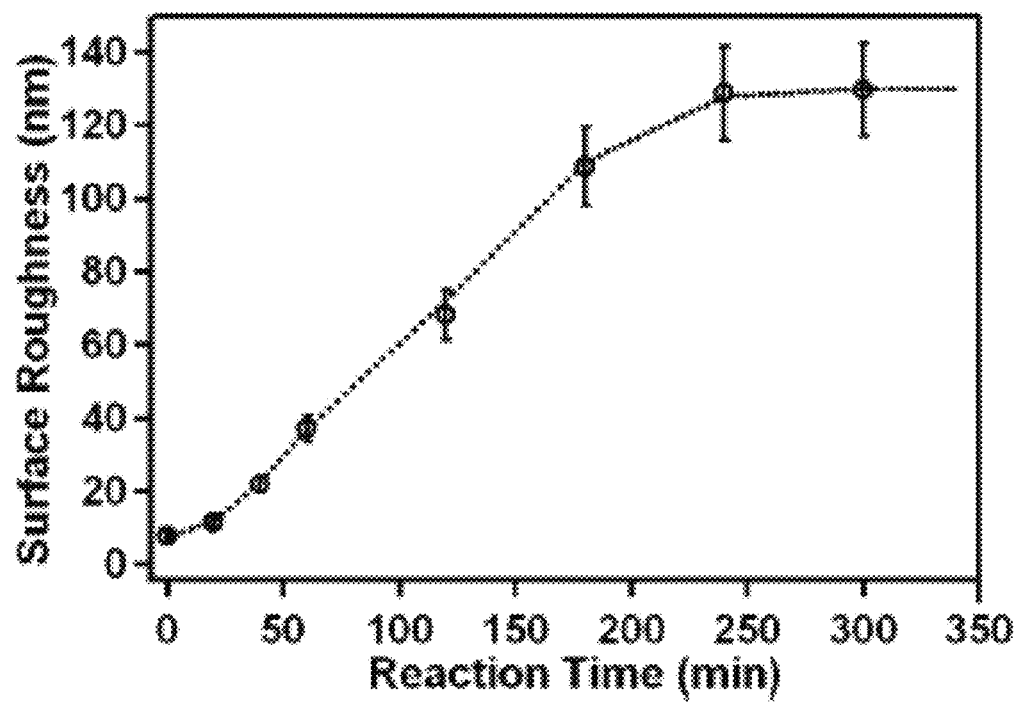
FIG. 11. Time-dependent evolution of the surface roughness (by means of AFM analysis) of the titanium foil at different growth stages, under hydrothermal conditions of 75° C. in the presence of 1 M NaOH, 50% $H_2O_2$, and a Ti foil.
Figure 12:
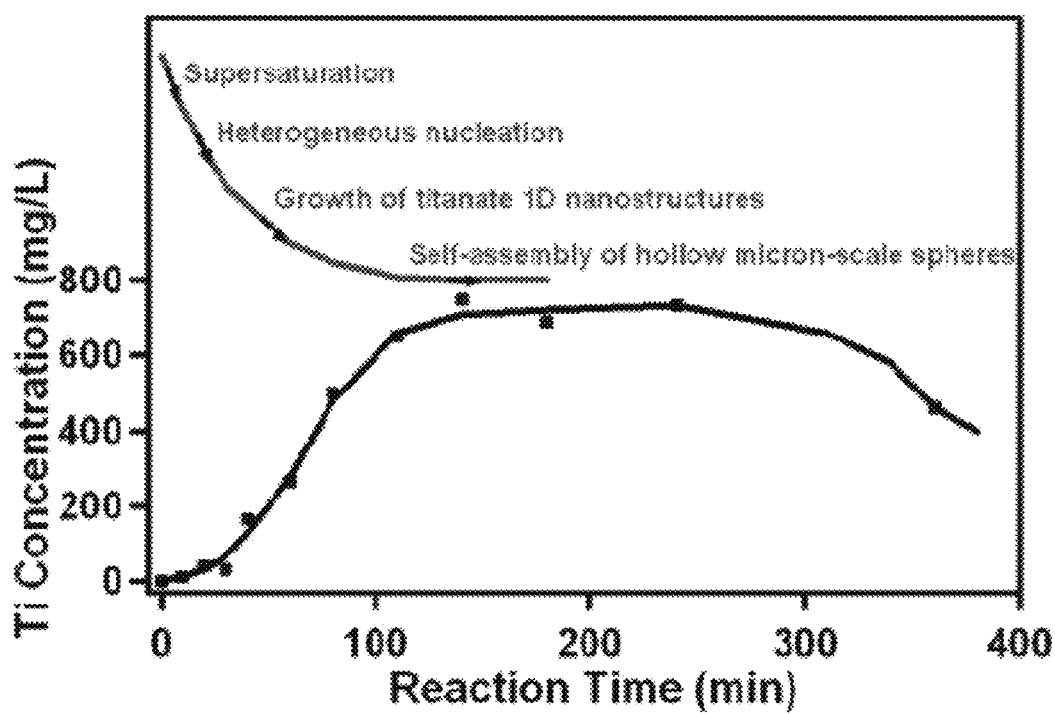
FIG. 12. Temporal evolution of titanium concentration, as measured by ICP-AES, in solution under hydrothermal conditions at 75° C. in the presence of 1 M NaOH, 50% $H_2O_2$, and a Ti foil. The upper blue curve marked with black arrows represents a hypothesized chronological sequence of growth stages.

Over the time course of the reaction of 360 min, as shown in FIGS. 11 and 12, titanium oxidation initially proceeded moderately through an $H_2O_2$-enhanced oxidation process in NaOH aqueous solution. As the titanium concentration in solution approached 650 mg/L during the initial ~120 min (FIG. 12), the Ti foil surface roughened (FIG. 11) as a result of a hydrothermally driven direct rolling up of titanate 2D nanosheets (Figure S7), generated in situ on the Ti foil surface. These nanosheets initially emanated from the redox reaction of Ti with $H_2O_2$ in the presence of NaOH solution (parts a-c of FIG. 10), then tended to curl under elevated temperature conditions, and ultimately, transformed into primary 1D nanostructures of titanates via a nanoscale rolling behavior (FIG. 10d and S7b). Indeed, it is plausible to assume, based on the rolling growth mechanism previously reported,[42] that the interface between the Ti and the chemically dissimilar peroxide (under high pH conditions) provided a unique microenvironment for (a) the initial formation of a surface sodium titanate hydrogel phase and for (b) the subsequent rolling up of nanosheets,[38] formed in situ on the Ti foil, into 1D tubes/wires (Figure S7b with structures denoted by white arrows). A narrow window of titanium concentration at approximately the supersaturation value of ~700 mg/L was further maintained in the subsequent growth of these 1D structures (FIG. 12).

During the following time period probed from 120 to 180 min, 1D titanate nanostructures subsequently started to self assemble on the surface, gradually forming 3D spheres, approximately ~1 μm in size (parts e and f of FIG. 10). The driving force for aggregate formation likely is associated with factors such as interfacial tension, van der Waals attractive forces, and the reasonably postulated hydrophilicity of adjacent titanate surfaces. Another explanation hypothesized for the observed agglomeration may reside in the slow convection process, creating localized pockets of high concentrations of 1D titanate nanostructures, in the autoclave during the hydro-thermal treatment. Upon further increase of the reaction time from 180 to 240 min and onward to 360 min, the titanate 1D nanostructures continued to organize on the surface, eventually assembling into fully developed 3D hollow micrometer-scale spherical architectures, measuring ~1 μm in diameter (parts g and h of FIG. 10). The observed decrease in titanium concentration after 300 min was likely due to a decrease in the amount and availability of $H_2O_2$, which thereby slowed the overall oxidation process (FIG. 12). In addition to the feasibility of this reaction in the presence of NaOH and Ti foil, regular hollow micrometer-scale spherical assemblies of alkali metal titanate 1D nanostructures could also be routinely produced in the presence of KOH and/or Ti powder.

Although not wanting to be bound by a mechanism, it is suggested that the observations are the result of a two-stage growth mechanism involving the initial formation of primary 1D nanostructures that subsequently self-assemble, or more specifically, a "growth-then-assembly" process (FIGS. 10 and 12). It is reasonable that subsequent acid leaching and neutralization exchange the $Na^+$ with $H^+$ to form assemblies of hydrogen titanate 1D nanostructures. A high-temperature treatment and accompanying dehydration process transform these assemblies of 1D nanostructures into their anatase titania analogues without atom-by-atom recrystallization of anatase.

In summary, a modified, $H_2O$-assisted hydrothermal method was successfully developed to synthesize micrometer-scale hollow spheres of titanate and anatase 1D nanostructures. The template-free and surfactant-free synthetic methodology of hierarchical structures of 1D nanostructures is a simple, inexpensive, scalable, and mild synthetic process.

Also demonstrated is that micrometer-scale assemblies of $TiO_2$ 1D nanostructures are active photocatalysts for the degradation of synthetic Procion Red dye under UV light illumination (Figure S8). Thus, the high-quality, micrometer-scale, sea-urchin-like structures synthesized with their large surface area-to-volume ratio can be incorporated as functional components of a number of devices including photonic instruments, dye-sensitized solar cells, as well as photocatalysts.

Single Crystalline Nanomaterials Comprising Titanium Oxide

In these examples, the size dependence of a number of hydrothermally prepared titanate nanostructure "reagents" in controllably prepared anatase $TiO_2$ products by a reasonably mild hydrothermal process coupled with a dehydration reaction was studied. (Bavykin et al., Mater. Chem. 2004, 14, 3370.) Titanate nanowires and nanotubes are converted into anatase titania nanowires and nanoparticles, respectively, at essentially 100% yield under neutral aqueous, relatively low-temperature conditions. In fact, the present invention shows that the size and shape of the precursor titanate structural motif strongly dictate and control the eventual morphology of the resulting titania products. This invention allows for localized size- and shape-dependent transformation between oxide nanostructure motifs. Moreover, the as-synthesized crystalline anatase $TiO_2$ products are chemically pure, prepared without the use of either mineralizers or anionic additives.

These examples demonstrate that a controllable size- and shape-dependent morphological change between protonic lepidocrocite titanate and anatase $TiO_2$ nanostructures can readily occur under relatively simple hydrothermal reaction conditions, in neutral solution, and at reasonably low temperatures. That is, the size and morphology of the nanosized reactants can dictate that of the corresponding nanosized products. Thus, the tools are provided for nanoscale design as well as for the probing of morphology-dependent properties in nanomaterials. Moreover, the $TiO_2$ nanoparticulate products isolated are single-crystalline, of the anatase phase, and of satisfactory purity, without impurities arising from brookite or rutile, all of which are desirable characteristics for nanostructured materials with potential applications in photocatalysis and other chemical processes.

Materials Preparation.

A. Titanates.

The hydrothermal method initially developed by Kasuga et al. was employed for the synthesis of titanate nanostructures, which involved a primary reaction between a concentrated NaOH solution and titanium dioxide. (Bavykin et al., Mater. Chem. 2004, 14, 3370; Kasuga et al., Adv. Mater. 1999, 11, 1307.) Specifically, a commercial anatase $TiO_2$ powder (Alfa Aesar, 0.1-1 g) was dispersed in an 18 mL aqueous solution of NaOH (5-10 M) and placed into a Teflon-lined autoclave with an 80% filling factor. The autoclave was then oven-heated at 110-190° C. for 12 h to 1 week. A white precipitate was isolated upon filtration and washed repeatedly with copious amounts (100 to 200 mL) of distilled, deionized water until the pH value of the supernatant had attained a reading close to 7. After collection by centrifugation and oven drying at 120° C. overnight, the as-produced 1-D sodium hydrogen titanate nanomaterials were neutralized using a 0.1 M HCl solution and subsequently washed with distilled, deionized water (~100 to 200 mL until the pH of the supernatant had attained a value of (~7) to prepare their hydrogen titanate analogues, which were subsequently oven-dried at 120° C. overnight.

B. Titania.

To synthesize the corresponding anatase nanostructures, dried hydrogen titanate nanostructures (~50 mg) were dispersed into 16 mL of distilled water for 1 h by stirring and then transferred to a 23 mL autoclave, which was kept at 170° C. in this case, for 12-36 h. (Feng et al., Chem. Mater. 2001, 13, 290.) A white precipitate was eventually recovered upon centrifugation.

Materials Characterization.

All products and intermediate precursors in this reaction, including hydrogen titanate nanostructures, were characterized by a number of different methodologies, including X-ray diffraction (XRD), Raman spectroscopy, ultraviolet-visible (UV-vis) spectroscopy, scanning electron microscopy (SEM), transmission electron microscopy (TEM), high-resolution transmission electron microscopy (HRTEM), selected area electron diffraction (SAED), and energy-dispersive X-ray spectroscopy (EDS).

X-Ray Diffraction.

Crystallographic and purity information on hydrogen titanate and anatase $TiO_2$ nanostructures were obtained using powder XRD. To analyze these materials, as-prepared samples of hydrogen titanate and anatase $TiO_2$, after centrifugation, were subsequently sonicated for about 1 min and later air-dried upon deposition onto glass slides. Diffraction patterns of these materials were collected using a Scintag diffractometer, operating in the Bragg configuration using Cu $K\alpha$ radiation ($\lambda$=1.54 Å) from 5° to 80° at scanning rates of 0.2° per min.

Raman Spectroscopy.

Spectra were acquired with a Raman microspectrometer (Renishaw 1000) using an $Ar^+$ laser (514.5 nm). A 50× objective and low laser power density were chosen for irradiation of bulk hydrogen titanate and commercial anatase $TiO_2$ samples in addition to all of the nanostructure samples, as well as for signal collection. The laser power was kept low enough to avoid heating of the samples by optical filtering and/or defocusing the laser beam at the sample surface. Spectra were collected in the range of 1000-50 $cm^{-1}$ with a resolution of 1 $cm^{-1}$.

UV-Visible Spectroscopy.

UV-visible spectra were obtained at high resolution on a Thermospectronics UV1 spectrometer using quartz cells with a 10-mm path length. Spectra were obtained for hydrogen titanate and anatase nanostructures which had been sonicated in distilled water to yield homogeneous dispersions. UV-visible absorption spectra were recorded using distilled water as a blank.

Electron Microscopy.

The size, morphology, and chemical composition of solid powder samples of precursor hydrogen titanate and resulting anatase $TiO_2$ nanostructures were initially characterized using a field emission SEM (Leo FE-SEM 1550 with EDS capabilities) at accelerating voltages of 15 kV. Specifically, powders of hydrogen titanate and anatase $TiO_2$ nanostructures were mounted onto conductive carbon tapes, which were then attached onto the surfaces of SEM brass stubs. These samples were then conductively coated with gold by sputtering for 20 s to minimize charging effects under SEM imaging conditions.

Low magnification TEM images were taken at an accelerating voltage of 120 kV on a Philips CM12 instrument, equipped with EDS capabilities. HRTEM images and SAED patterns as well as EDS data were obtained on a JEOL 2010F HRTEM (equipped with an Oxford INCA EDS system as well as with the potential of performing SAED) at an accelerating voltage of 200 kV to further characterize the morphologies of individual nanostructures of hydrogen titanate and anatase $TiO_2$. Specimens for the TEM studies were prepared by depositing a drop of these aqueous suspension samples onto a 300 mesh Cu grid, coated with a lacey carbon film. Prior to deposition, solutions containing samples of hydrogen titanate and anatase nanostructures were sonicated for 2 min to ensure adequate dispersion in solution.

Elemental Analysis.

Inductively coupled plasma mass spectroscopy (ICP-MS) was accomplished using a Perkin-Elmer Sciex Elan 6100 ICP-MS instrument. A 60-element semiquantitative metals screen was performed on representative samples. The presence of Bi was attributed to impurities originating from the autoclave.

Photocatalytic Activity.

To test the photochemical efficiency of as-prepared $TiO_2$ samples, a solution mixture of 100 mg/L Procion Red MX-5B (Aldrich) containing 100 mg/L $TiO_2$ nanostructures in water was prepared under irradiation with a UV lamp (maximum emission wavelength at 365 nm) at a ~5 cm separation distance. Analogous control experiments were performed either without $TiO_2$ (blank) or with commercial nanosized $TiO_2$. At given irradiation time intervals, 10 mL aliquots were sampled and centrifuged to remove remnant $TiO_2$ particles. Supernatant aliquots were subsequently analyzed by UV-visible spectroscopy at high resolution using a Thermospectronics UV1 spectrometer with 10-mm path length quartz cells.

Results

Hydrogen titanates of varied sizes and shapes were controllably prepared, obtained at different reaction temperatures. Upon subsequent reaction, these nanoscale precursors yielded nanosized titania products whose structural morphology was intrinsically dependent on the size and shape of the starting reagent nanomaterial.

(i) Hydrogen titanate nanotubes (~7 to 10 nm in diameter) were transformed into single-crystalline anatase nanoparticles.

(ii) Small-diameter hydrogen titanate nanowires (≤200 nm) were converted into single-crystalline anatase nanowires with relatively smooth surfaces.

(iii) Large-diameter hydrogen titanate wires (~200 to 500 nm) were altered into anatase wires, resembling clusters of adjoining anatase nanocrystals with perfectly parallel, oriented fringes.

XRD.

Figure 13:
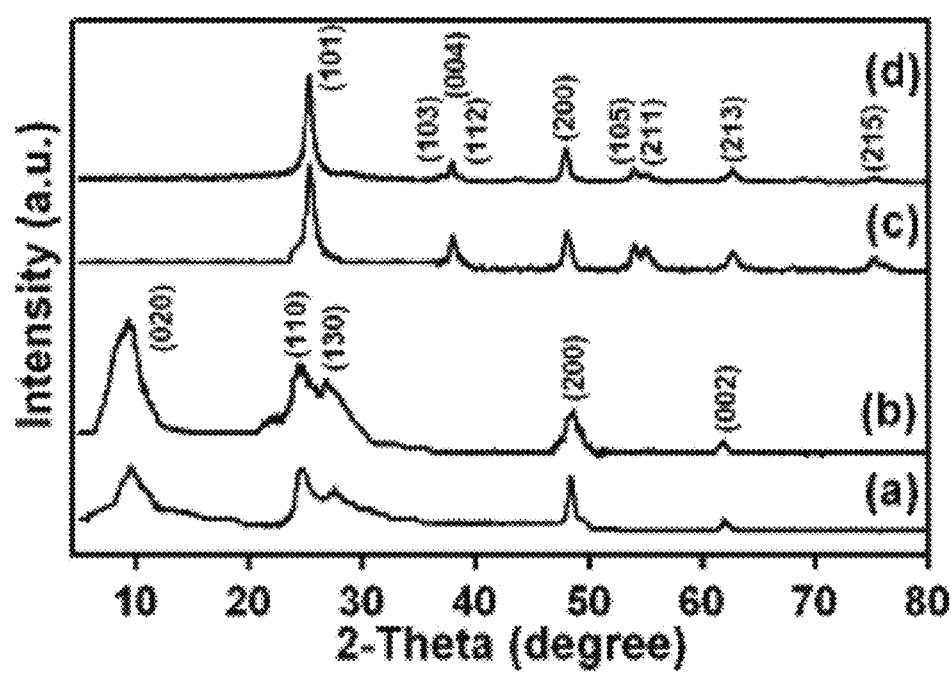
FIG. 13. XRD patterns from (a) hydrogen titanate nanotubes, (b) hydrogen titanate nanowires, (c) anatase $TiO_2$ nanoparticles, and (d) anatase $TiO_2$ nanowires, respectively.

As-prepared solid samples of both hydrogen titanate and anatase nanostructures were examined by powder XRD measurements (FIG. 13). The XRD patterns of both hydrogen titanate nanotubes and nanowires (FIGS. 13a and b, respectively) do not correspond to either pristine titania phases of anatase, rutile, or brookite, or to a mixture thereof. In fact, based on the experimental data, it is more appropriate to ascribe the crystal structure of the instant as-prepared hydrogen titanate nanotubes and nanowires to that of a structural variant of $H_2Ti_3O_7$. More specifically, it is reasonable to assign the XRD patterns to those of an orthorhombic protonic lepidocrocite ($H_xTi_{2-x/4}\square_{x/4}O_4$ (x~0.7, $\square$: vacancy)) structure because of the observation of 2θ values at 9.6°, 24.7°, 28.02°, 48.22°, and 62°, which can be attributed to the relevant 020, 110, 130, 200, and 002 peaks, respectively. (Mao et al., *J. Phys. Chem. B* 2006, 110, 702; Ma et al., *Chem. Phys. Lett.* 2003, 380, 577; Ma et al., *J. Phys. Chem. B* 2005, 109, 6210.) Also observed was a stronger intensity of the (020) reflection for nanowires as compared with that of the corresponding nanotubes.

All of the diffraction peaks in FIGS. 13c and d after further hydrothermal treatment of the hydrogen titanate nanostructures prepared under neutral conditions could be indexed to the pure hexagonal anatase phase of $TiO_2$. The intensities and positions of the observed peaks are in good agreement with literature values (space group $I4_1/amd$; JCPDS File No. 21-1272). (Li et al., *J. Am. Chem. Soc.* 2005, 127, 8659; Zhang et al., *Nano Lett.* 2001, 1, 81.) No peaks of the rutile or brookite phase were detected, indicating satisfactory purity of the products.

Raman Spectroscopy.

Figure 14:
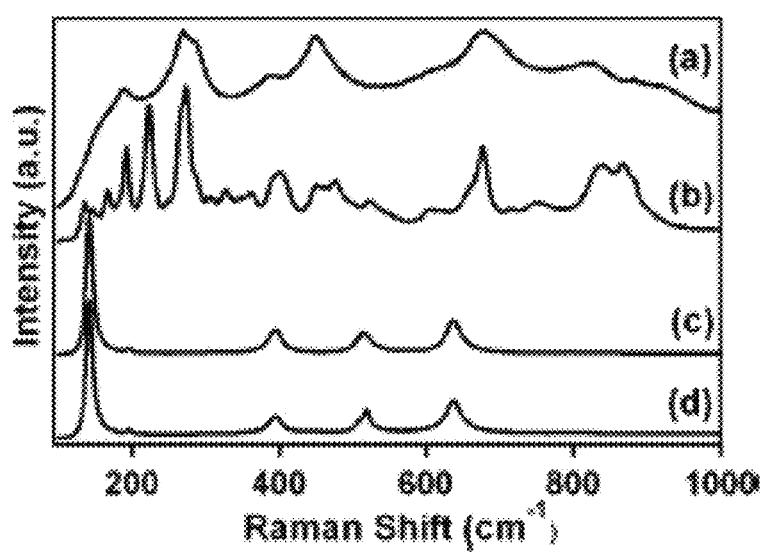
FIG. 14. Raman spectra of (a) as-prepared hydrogen titanate nanowires, (b) bulk $H_2Ti_3O_7$, (c) as-prepared anatase $TiO_2$ nanowires, and (d) commercially available 5 nm anatase nanoparticles, respectively.

Since Raman spectra of both as-prepared hydrogen titanate nanowires and nanotubes were essentially identical, only the spectrum of hydrogen titanate nanowires is presented in FIG. 14a, which displays very broad bands near 195, 280, 450, 680, and 920 $cm^{-1}$, respectively. In agreement with the XRD data previously discussed, the observed spectrum shows very similar peak positions and profiles to that of protonic lepidocrocite titanate ($H_xTi_{2-x/4}\square_{x/4}O_4$ (x~0.7, $\square$: vacancy)). (Mao et al., *J. Phys. Chem. B* 2006, 110, 702; Ma et al., *J. Phys. Chem. B* 2005, 109, 6210; Sasaki et al., *Chem. Mater.* 1997, 9, 602.) By contrast, the spectrum of a bulk $H_2Ti_3O_7$ sample, generated by the neutralization of a bulk $Na_2Ti_3O_7$ product obtained commercially (Aldrich), is presented as spectrum b in FIG. 14. It is evident that with this as-prepared bulk $H_2Ti_3O_7$ sample, there is an abundance of sharp peaks in the lower wavenumber regime of 100-400 $cm^{-1}$ as well as a characteristically strong peak near ~850 $cm^{-1}$ (Mao et al., *J. Phys. Chem. B* 2006, 110, 702; Ma et al., *J. Phys. Chem. B* 2005, 109, 6210), all of which are absent in the spectrum of the instant as-prepared 1-D hydrogen titanate nanostructures. This observation is consistent with ascribing the structures of the present invention to the presence of protonic lepidocrocite titanate titanate ($H_xTi_{2-x/4}\square_{x/4}O_4$ (x~0.7, $\square$: vacancy)) sheets. The sole caveat is that because there are few reports directly relating observed Raman peaks to specific active modes of layered titanates, the exact assignment of the bands in the Raman spectra may not be fully accurate.

The Raman spectrum of $TiO_2$ nanostructures (FIG. 14) shows the presence of five characteristic peaks, expected of anatase. No other peaks, corresponding to other titania phases, were observed, indicating that the instant as-prepared titanium dioxide nanostructures were likely pure anatase in phase. In fact, observed peaks at 143 $cm^{-1}$ ($E_g$), 197 $cm^{-1}$ ($E_g$), 399 $cm^{-1}$ ($B_{1g}$), 519 $cm^{-1}$ ($B_{2g}$), and 639 $cm^{-1}$ ($E_g$) matched well with those of single crystalline anatase (FIG. 14c). Moreover, the presence of well-resolved, higher-frequency Raman lines with substantial intensities indicated that the nanostructures were highly purified with few defects. (Zhao et al., *Bull. Korean Chem. Soc.* 2004, 25, 1341.) FIG. 14d shows the Raman spectrum of a sample of 5 nm anatase nanoparticles, obtained commercially from Alfa Aesar as a comparison.

UV-Visible Spectroscopy.

Figure 15:
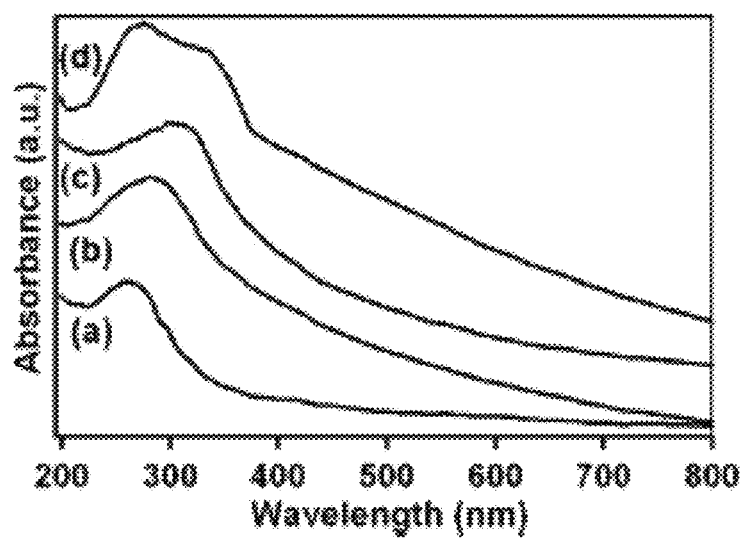
FIG. 15. UV-vis spectra of as-prepared (a) hydrogen titanate nanotubes, (b) hydrogen titanate nanowires, (c) anatase $TiO_2$ nanoparticles, and (d) anatase $TiO_2$ nanowires, respectively. The curves are shifted vertically for clarity.

UV-visible spectra of as-prepared protonic lepidocrocite titanate and titania nanostructures are shown in FIG. 15. It is evident that for all the protonic lepidocrocite titanate and titania nanostructure samples, there is a broad band absorption from 250 to 350 nm, due to the transition from the $O^{2-}$ antibonding orbital to the lowest empty orbital of $Ti^{4+}$. (Xu et al., *Mater. Sci. Eng. B* 1999, 63, 211.) Moreover, the absorption band of the smaller-sized (tens of nm) protonic titanate nanotubes (FIG. 15a) is blue shifted relative to that of the relatively larger (hundreds of nm) protonic titanate nanowires (FIG. 15b). This blue shift can be rationalized based on a previous study, wherein it was found that, with decreasing sample size, the optical edge tended to shift to higher energy, a phenomenon which was attributed to quantum size and confinement effects. (Brus, L. E. *J. Phys. Chem.* 1986, 90, 2555.) The corresponding absorption bands of anatase nanoparticles and of anatase $TiO_2$ nanowires are shown in FIGS. 15c and 15d respectively. Also note that the positions of the absorption peaks of protonic titanate and anatase titania samples suggest that these materials are wide band gap semiconductors, a conclusion which is consistent with previous reports. (Zhu et al., *J. Am. Chem. Soc.* 2005, 127, 6730; Hoffmann et al., *Chem. Rev.* 1995, 95, 69.)

Microscopy of Protonic Titanate Nanostructures.

A. Nanotubes.

Figure 16:
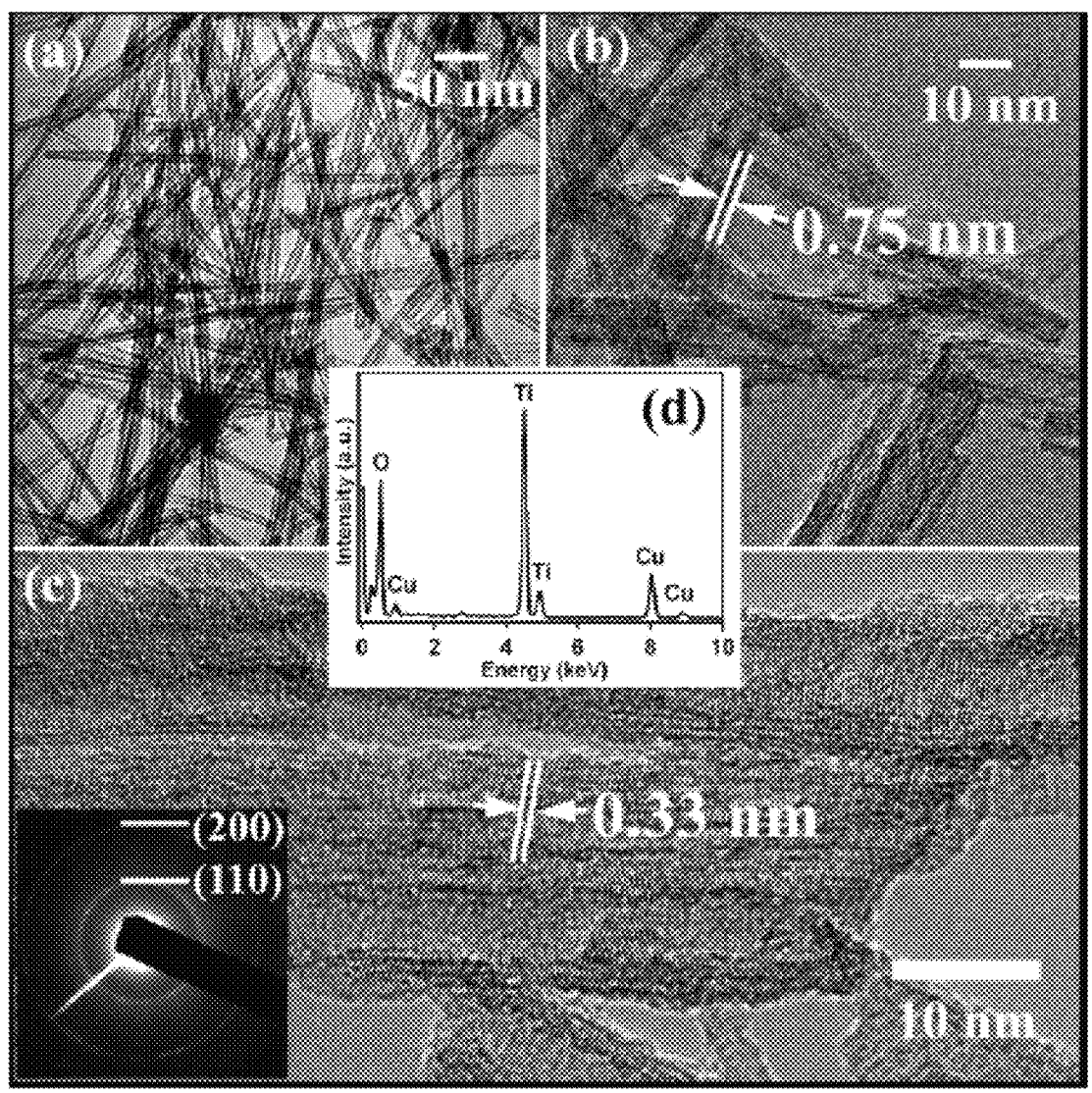
FIG. 16A. As-prepared hydrogen titanate nanotubes. Low magnification TEM image.
FIG. 16B. As-prepared hydrogen titanate nanotubes. HRTEM images.
FIG. 16C. As-prepared hydrogen titanate nanotubes. HRTEM images. The inset shows an electron diffraction (ED) pattern.
FIG. 16D. As-prepared hydrogen titanate nanotubes. EDS spectrum. The Cu peaks originate from the TEM grid.

FIGS. 16a and 16b indicated that the titanate sample, prepared at 120° C. under hydrothermal conditions, consisted of a large quantity of nanotubes with lengths in the range of several hundred nanometers, outer diameters of ~7-10 nm, and inner diameters of 3-5 nm HRTEM observations revealed that these nanotubes normally consisted of three to five layers in terms of wall thickness (FIG. 16b).

The measured interlayer spacing was found to be about 7.5 Å (FIG. 16b); the d spacing measurement perpendicular to the tube axis yielded a value of 3.3 Å (FIG. 16c). It is well-known that protonic titanates can dehydrate during experimental microscopy conditions because of the high vacuum environment and the bombarding effect of electrons, which may collectively lead to a degree of shrinkage in the interlayer spacing. (Ma et al., *Chem. Phys. Lett.* 2003, 380, 577.) Thus, the interlayer distances measured from the HRTEM images herein may not be as accurate and most likely decreased upon loss of hydrated water. This possibility is consistent with the present observation that the perfect lattice tended to degrade after a few seconds of electron beam irradiation. Therefore it was considered reasonable to index the observed 7.5 Å distance to $d_{020}$ and the measured 3.3 Å distance to $d_{110}$, respectively, of an orthorhombic protonic lepidocrocite ($H_xTi_{2-x/4}\square_{x/4}O_4$ (x~0.7, $\square$: vacancy)) structure. In fact, the inset of FIG. 16c yields an SAED pattern, with the two rings indexed to the (200) and (110) diffraction planes, respectively, of the orthorhombic lepidocrocite structure. The EDS data (FIG. 16d) clearly indicate that the titanate nanotubes are composed of Ti and O, as expected. No Na was detected in the nanostructures, after washing with HCl. Taking into consideration the likely presence of H in the product, this sample can therefore be attributed to a protonic titanate species, in agreement with XRD and Raman results.

B. Nanowires.

Figure 17:
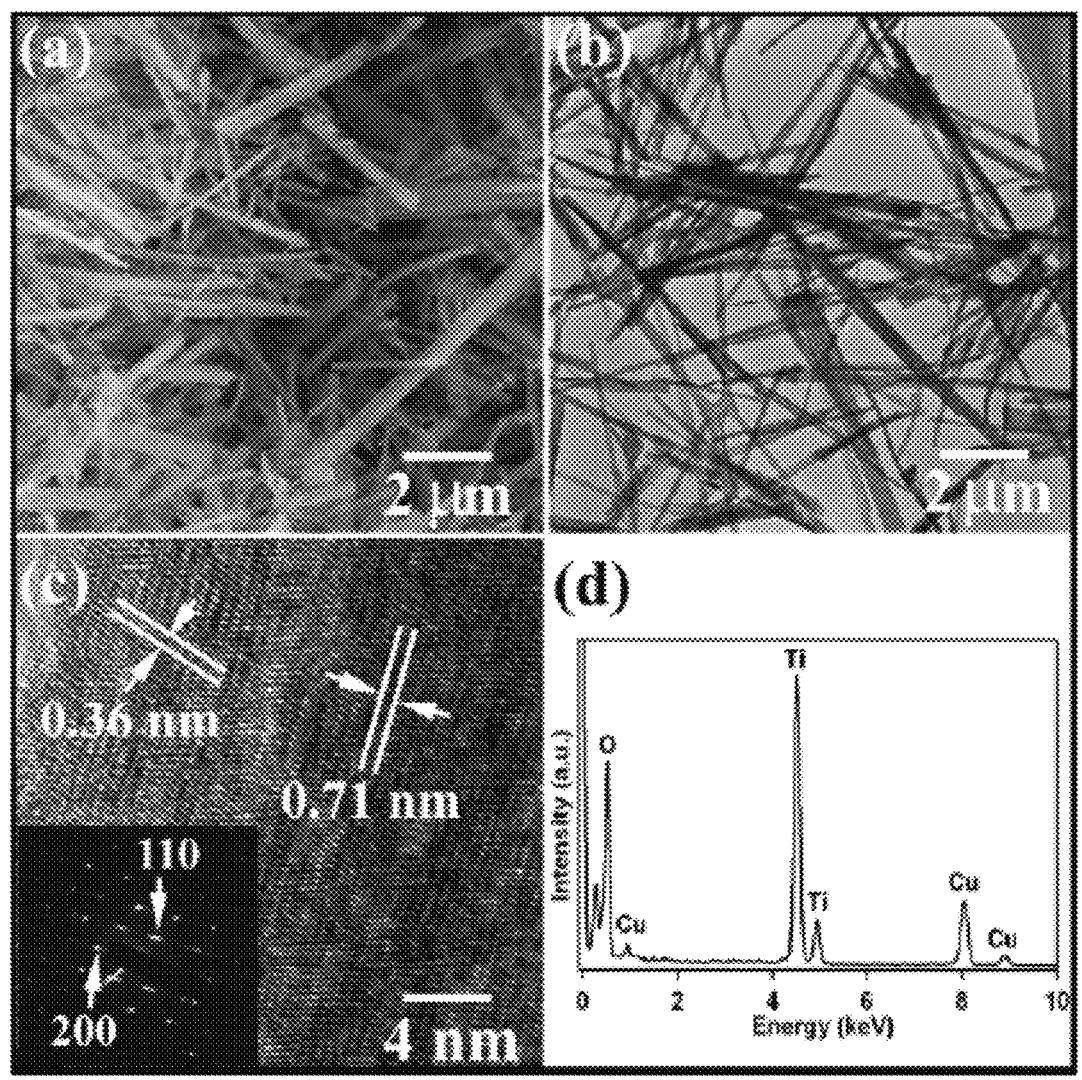
FIG. 17A. As-prepared hydrogen titanate nanowires. Typical SEM image.
FIG. 17B. As-prepared hydrogen titanate nanowires. TEM image.
FIG. 17C. As-prepared hydrogen titanate nanowires. HRTEM image. The inset shows the corresponding SAED pattern.
FIG. 17D. As-prepared hydrogen titanate nanowires. EDS data. The Cu peaks originate from the TEM grid.

FIGS. 17a and 17b show representative SEM and TEM images taken from the as-synthesized protonic titanate nanowires, neutralized from sodium hydrogen titanate nanowires that had been prepared under hydrothermal conditions at 180° C. In this sample, the as-prepared nanowires were measured to be a few microns long and ~65 to 400 nm wide. Two distinctive populations of diameter distributions of protonic titanate nanowires were observed (Figure SI). Though these nanowires tended to aggregate fairly easily, as can be observed from the SEM image (FIG. 17a), sonication could readily resolve this problem, as shown in the corresponding TEM image (FIG. 17b).

The HRTEM image (FIG. 17c) indicates that, in this particular nanowire sample, the interlayer distance measured along the wire is ~0.71 nm, whereas the interlayer distance measured perpendicular to the wire is ~0.36 nm Once again, considering the likelihood of sample dehydration during microscopy observations (Ma et al., *Chem. Phys. Lett.* 2003, 380, 577), the 0.71 nm distance could be indexed to $d_{020}$, whereas the 0.36 nm distance could be assigned to $d_{110}$ of $H_xTi_{2-x/4}\square_{x/4}O_4$ (x~0.7, $\square$: vacancy). The inset of FIG. 17c yields an SAED pattern, which can be indexed to the (200) and (110) diffraction planes, respectively, of the orthorhombic lepidocrocite structure, although some displacement of the original spots was noted, indicating that a structural transformation had taken place upon electron beam exposure. (Ma et al., *Chem. Phys. Lett.* 2003, 380, 577.) The EDS spectrum (FIG. 17d) clearly indicates that the titanate nanowires are composed solely of Ti and O. As with the titanate nanotubes, no Na was detected in the nanostructures after washing with HCl though the presence of Na was noted by ICP-MS (Table SI). Moreover, taking into consideration the likely presence of H in the product, this nanowire sample can therefore be attributed to a protonic titanate species, in agreement with XRD and Raman results.

Microscopy of Titania Nanostructures.

A. Nanoparticles.

Figure 18:
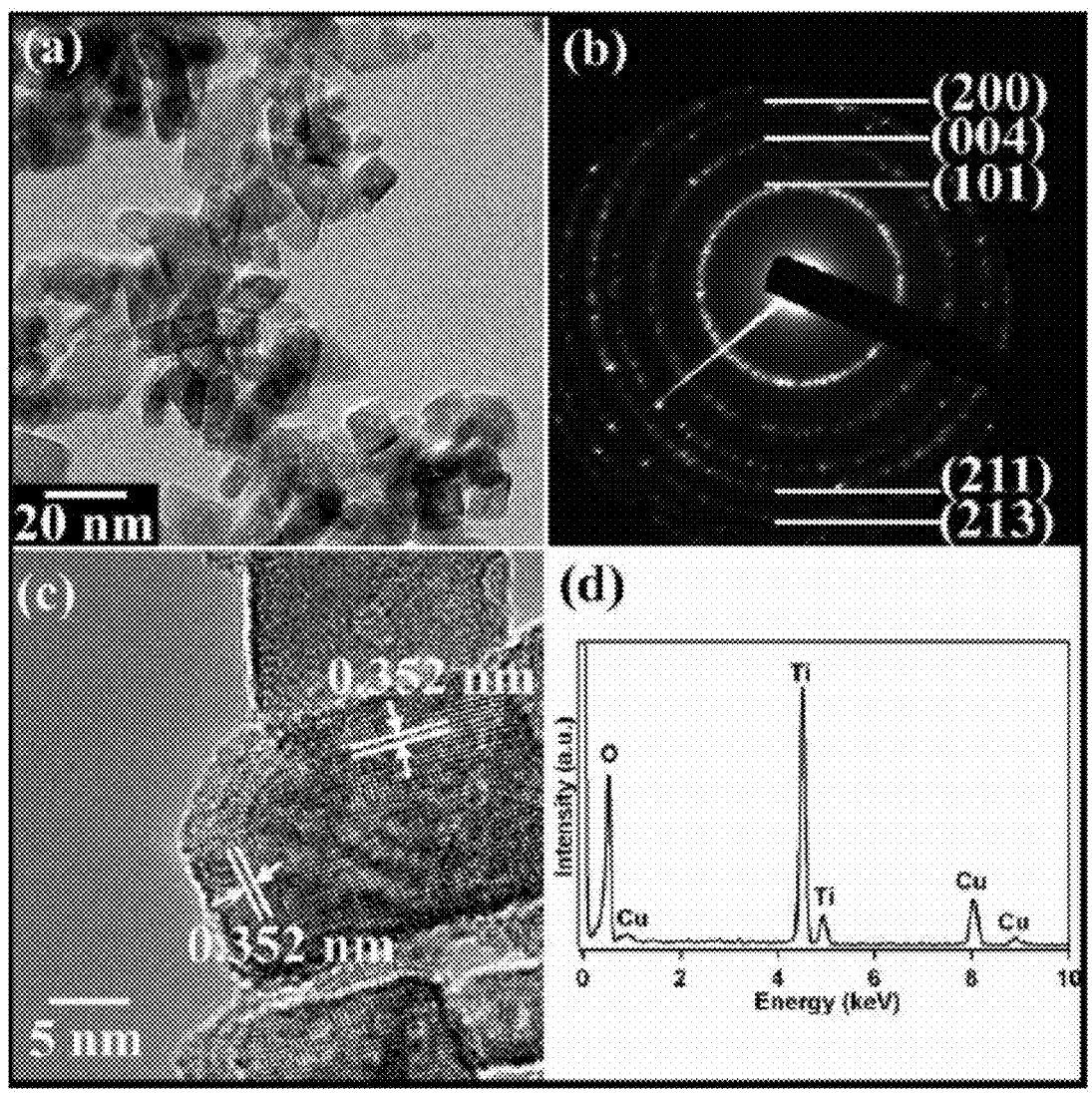
FIG. 18A. As-prepared anatase $TiO_2$ nanoparticles. TEM image.
FIG. 18B. As-prepared anatase $TiO_2$ nanoparticles. ED pattern.
FIG. 18C. As-prepared anatase $TiO_2$ nanoparticles. HRTEM image.
FIG. 18D. As-prepared anatase $TiO_2$ nanoparticles. EDS data. The Cu peaks originate from the TEM grid.

After an additional hydrothermal cycling involving precursor titanate nanotubes reacted at 170° C. for 24 h, all of the nanosized protonic lepidocrocite titanate nanotube precursors were transformed into corresponding anatase $TiO_2$ nanoparticles, which mainly consisted of nanoscale cubes and rhombohedra, as demonstrated by the TEM image in FIG. 18a These nanoparticles have an average size of 12±2 nm. FIG. 18b shows an SAED pattern, with the five rings indexed to the (101), (004), (200), (211), and (213) diffraction planes, respectively, of the hexagonal structure of anatase $TiO_2$, in agreement with that of bulk crystal data. In the HRTEM image of the resulting anatase $TiO_2$ nanoparticles (FIG. 18c), one can clearly observe a 0.352 nm lattice spacing between the (101) planes. The EDS spectrum (FIG. 18d) shows that these $TiO_2$ nanoparticles are elementally composed of Ti and O, with the Cu peaks originating from the TEM grid.

Based on these data, the $TiO_2$ nano-particles synthesized using this method are single-crystalline titania, with a hexagonal structure similar to that of the bulk crystalline anatase solid. This assertion is in agreement with the XRD pattern and Raman spectrum data (FIGS. 13c and 14c), taken from a collection of $TiO_2$ nanoparticles. It is worth noting that previous methodologies aimed at synthesizing anatase nanoparticles have been primarily associated with either sol-gel methods involving the use of titanium tetrachloride or titanium alkoxide precursors or through solution chemistry techniques associated with titanium sulfates. (Li et al., *J. Am. Chem. Soc.* 2005, 127, 8659.) In these prior reports, such protocols have tended to be associated with the generation of either chemical impurities or minor impurity phases in the final anatase $TiO_2$ products. (Zhang et al., *Nano Lett.* 2001, 1, 81.)

By contrast, the synthesis of the present invention yields anatase $TiO_2$ nanoparticles with controllable chemical composition (without the obvious presence of impurities) as well as particle morphology, produced under hydrothermal conditions in neutral aqueous solvent without the use of mineralizers, anions, or similar additives (such as $SO_4^{2-}$, $NH_4Cl$, NaCl, $SnCl_4$, and so forth). Nonetheless, in some embodiment there can be a significant amount of hydroxyl species on the surfaces of these nanoparticles, which would be beneficial for an enhanced photocatalytic activity of these materials.

B. Nanowires.

Figure 19:
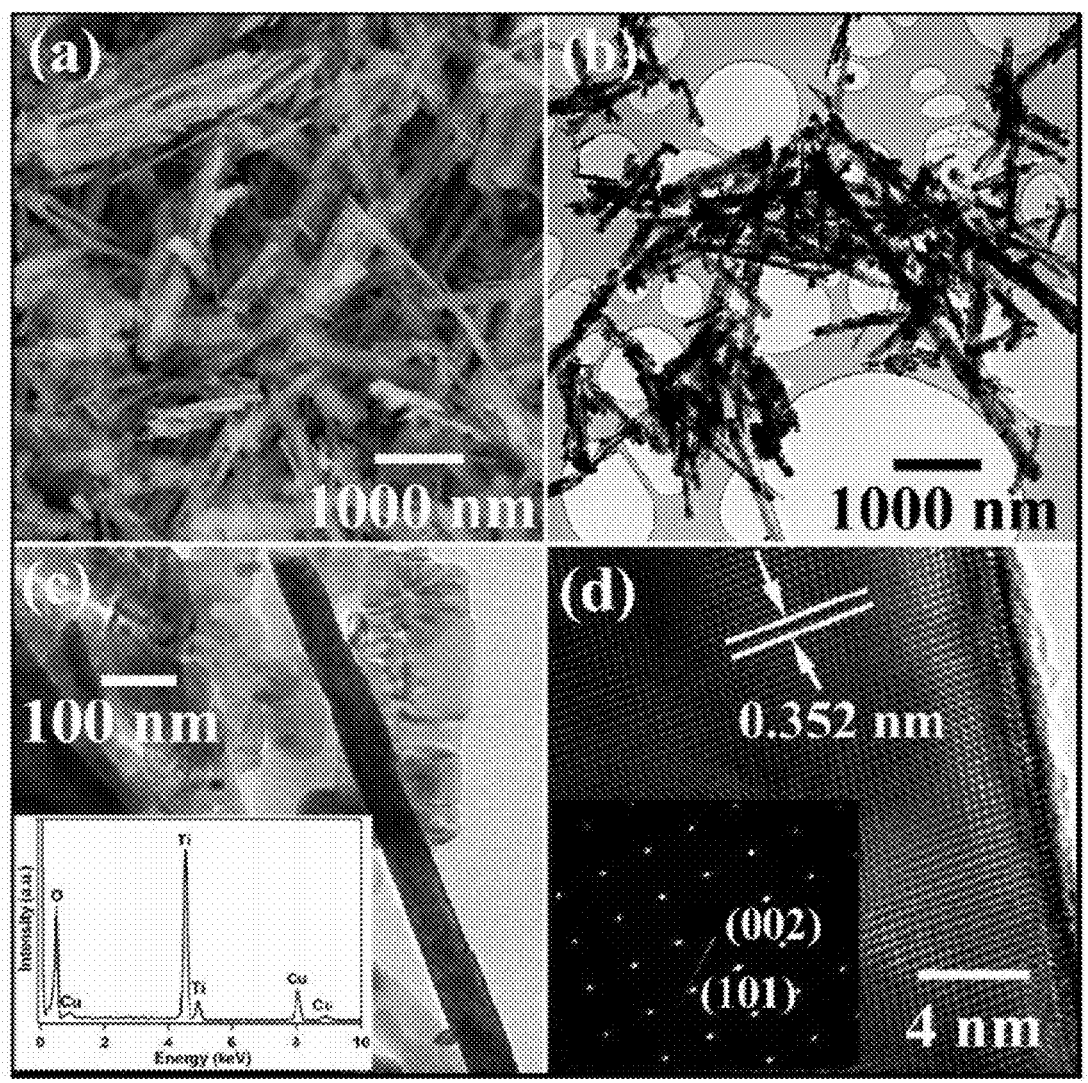
FIG. 19A. As-prepared anatase $TiO_2$ nanowires. General SEM image.
FIG. 19B. As-prepared anatase $TiO_2$ nanowires. TEM image.
FIG. 19C. An individual anatase nanowire with a diameter of ~80 nm: TEM image. The inset shows EDS data. The Cu peaks originate from the TEM grid.
FIG. 19D. HRTEM taken from a portion of the nanowire shown in FIG. 19C. The inset depicts the corresponding SAED pattern.

Anatase $TiO_2$ nanowires were synthesized by a similar hydrothermal soft chemical synthetic method. In this case, protonic lepidocrocite titanate nanowire precursors were used instead. As with the anatase $TiO_2$ nanoparticle synthesis, the reaction was also run at 170° C. for 24 h. The FESEM image (FIG. 19a) and TEM image (FIG. 19b) show that anatase $TiO_2$ nanowires are formed. The surfaces of the smaller diameter (≤200 nm) nanowires formed are uneven as compared with those of the precursor protonic titanate nanowires, while the surfaces of the larger diameter (~200 to 500 nm) wires synthesized are noticeably rougher than those of the precursor protonic titanate nanowires. In addition, clusters of some as-formed nanoparticles also were detected in this sample.

FIG. 19c illustrates an individual anatase nanowire with a diameter of around 80 nm and with a length of up to a few microns. The EDS data (inset to FIG. 19c) clearly show that the nanowires are composed of Ti and O elements alone; ICPMS data further confirm the lack of any high concentrations of impurities (under 0.1%) (Table S1). In the HRTEM image (FIG. 19d) taken from a portion of the individual anatase nanowire shown in FIG. 19c, one can observe a 0.352 nm lattice spacing between the (101) planes, indicating that the nanowires have a [101] orientation. The inset to FIG. 19d shows the SAED pattern, indexed to the (101) and (002) diffraction planes, respectively, of the hexagonal structure of anatase. Moreover, the HRTEM images and SAED patterns taken from different positions along the nanowire were found to be essentially identical within experimental accuracy, indicating that the entire nanowire is likely to be single-crystalline. In some embodiments, an amorphous coating covers the outer surfaces of some of these nanoscale structures.

Figure 20:
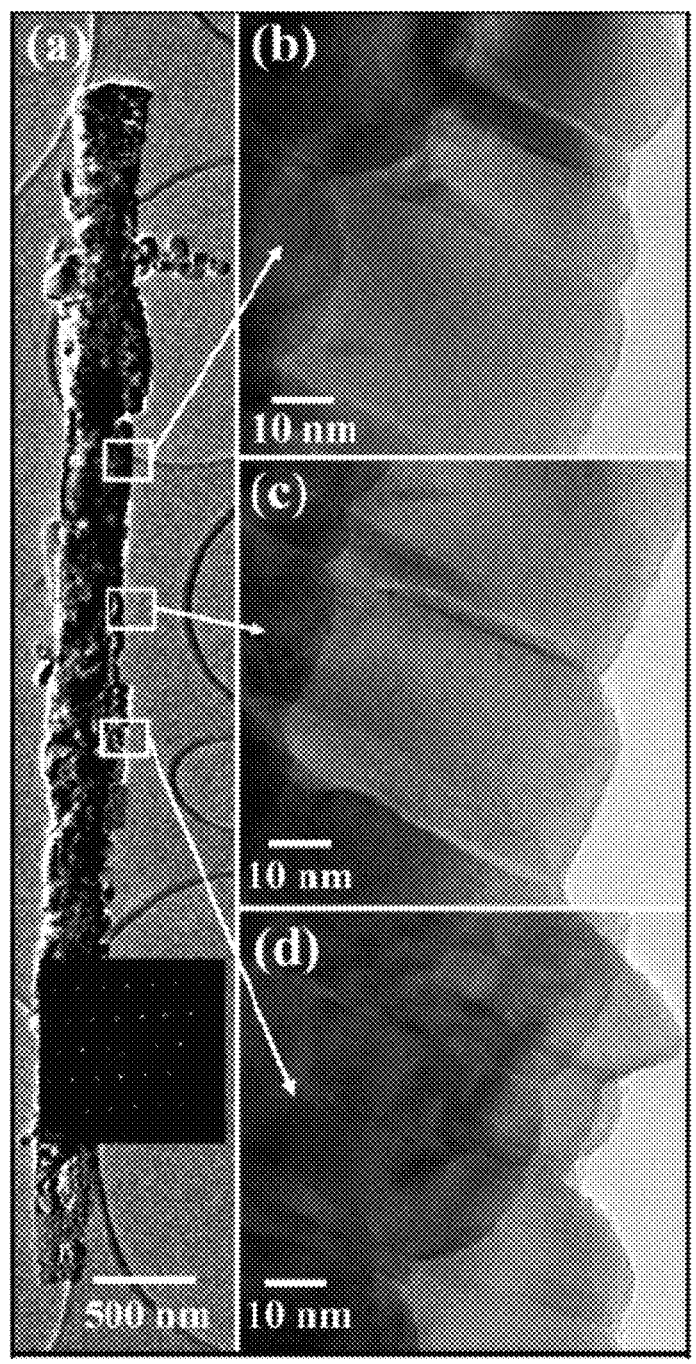
FIG. 20A. An individual submicron-sized anatase $TiO_2$ wire with a diameter of approximately 400 nm: TEM image. The inset shows the corresponding SAED pattern.
FIG. 20B. HRTEM image taken from portion along the wire shown in FIG. 20A, as delineated by individual white squares.
FIG. 20C. HRTEM image taken from portion along the wire shown in FIG. 20A, as delineated by individual white squares.
FIG. 20D. HRTEM image taken from portion along the wire shown in FIG. 20A, as delineated by individual white squares.

FIG. 20 demonstrates a few representative TEM and HRTEM images of a larger-diameter, individual anatase $TiO_2$ wire. Its width is around 400 nm, and its length can range up to several microns. It is evident though that this wire structure is completely covered by or otherwise composed of aggregates of discrete anatase $TiO_2$ nanocrystals (FIG. 20a). Three representative HRTEM images (FIG. 20b-d, S2-4) taken along the length of an individual, larger diameter wire shows that this wirelike structure is actually composed of a string of adjoining anatase TiO$_2$ nanocrystals. Strong faceting of the nanocrystal building blocks and the presence of defects at interfaces are clearly observed in these images. These as-formed nanocrystals are interconnected and aligned onto the adjoining wire surface with perfectly parallel lattice fringes, without the apparent presence of misorientations, though these cannot be fully discounted. That is, the anatase TiO$_2$ nanoparticles are all in the same orientation as the underlying uniaxial wire motif. The spacings of the lattice fringes were found to be about 0.352 and 0.475 nm, respectively, as further shown in Figures S2-4. These two planes could be well indexed as [101] and [002] lattice orientations of the anatase TiO$_2$ crystal, respectively, according to JCPDS card No. 21-1272. The measured angle between these two planes is 68.3°, matching closely with the calculated value based on JCPDS card No. 21-1272 literature data. The oriented arrangement of the anatase TiO$_2$ nanocrystals was confirmed by SAED analysis, which exhibited only one set of diffraction patterns along the entire wire (inset of FIG. 20a and Figure S5). The same SAED pattern shown in the inset of FIG. 20a was enlarged in Figure S5 and indexed to [101] and [002] planes, consistent with the HRTEM results. The data therefore suggest that anatase TiO$_2$ nanocrystals, constituting the wirelike aggregates, are essentially aligned in the same orientation and that, hence, the as-synthesized anatase TiO$_2$ wires (including both as-formed small nanowires as well as nanocrystal aggregates) grow along the [101] direction, regardless of the actual wire diameter.

Plausible Formation Mechanism.

A. Protonic Lepidocrocite Titanate Nanotubes to Titania Nanoparticles.

The results suggest that the diameter, i.e., the thickness, of the precursor nanostructure may be a critical determinant factor in governing the resultant shape of the product nanomaterial. (Son et al., Science 2004, 306, 1009.) It has been observed that, at the nanoscale, there are changes in the reaction free energy and the height of the reaction barrier, relative to the bulk. (Van Hove, M. A., J. Phys. Chem. B 2004, 108, 14265; Maradudin et al., J. Phys. Rev. 1964, 133, A1188.) For instance, by analogy to quantum dots, in the thin precursor protonic titanate nanotubes, the width of the reaction zone can become comparable in dimension to the whole width of the nanotube, due to the relatively small number of atomic layers present within a few nanometers of the structure. Hence, the slow propagation of the reaction front, driven by the gradient of the local chemical potential at or near the reaction zone, may no longer be the rate-limiting step of the reaction. Moreover, the thin protonic titanate nanotube may be in a structurally nonequilibrium state and, therefore, merely rearrange into its more stable thermodynamic state. For the thin protonic titanate nanotubes, a change of morphology to the thermodynamically more stable sphere, cube, or rhombohedron may occur, before the constituent ions have had the opportunity to diffuse, reorganize, and ultimately attain their kinetic equilibrium positions in the product.

B. Protonic Titanate Nanowires to Anatase Titania Nanowires/Nanocrystal Aggregates.

With lepidocrocite protonic titanate nanowire precursors, which are thicker than nanotubes and which appear to maintain their nonequilibrium shapes upon reaction, the reaction zone is not as affected by width considerations of the nanowire itself. Hence, propagation of the reaction front occurs, and the precursor nanostructure morphology is retained in the final titania product. (Son et al., Science 2004, 306, 1009.)

The transformation of larger-diameter hydrogen titanate nanowires (in this case, between 200 and 500 nm) into structures composed of aggregates of anatase TiO$_2$ nanocrystals and of smaller-diameter hydrogen titanate nanowires into single-crystalline anatase TiO$_2$ nanowires can be explained by several plausible scenarios. For example, one group observed hydrogen titanate nanofibers covered with aggregates of anatase nanocrystals. (Zhu et al., J. Am. Chem. Soc. 2004, 126, 8380.) To explain this, it was proposed that the phase transition from titanate to anatase occurred through a topochemical reaction process, in which the hydrogen titanate nanofibers dehydrated due to a reaction with acid, yielding anatase. It was assumed, because of the retention of the nanowire motif, that this dehydration process was accompanied by an in situ phase conversion (albeit incomplete due to formation of a composite structure), rather than through outright dissolution of titanate and atom-by-atom recrystallization of anatase.

Figure 21:
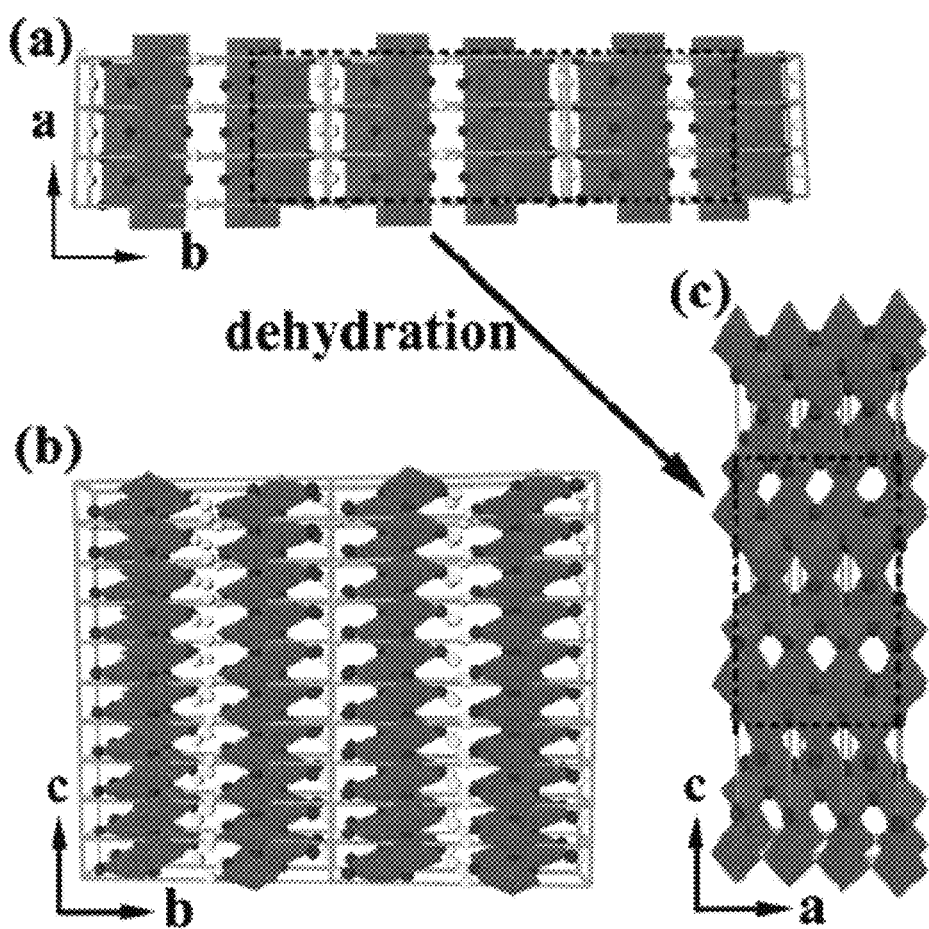
FIG. 21A. Schematic representations of crystal structures for the orthorhombic protonic lepidocrocite ($H_xTi_{2-x/4}\square_{x/4}O_4$ (x~0.7, 0: vacancy)) titanate structure. $TiO_6$ octahedra are in blue, oxygen atoms are in red, and hydrogen atoms are in yellow. View along the c-axis showing structural features, associated with the (110) faces of titanate (3×3×1 cells).
FIG. 21B. Schematic representations of crystal structures for the orthorhombic protonic lepidocrocite ($H_xTi_{2-x/4}\square_{x/4}O_4$ (x~0.7, 0: vacancy)) titanate structure. $TiO_6$ octahedra are in blue, oxygen atoms are in red, and hydrogen atoms are in yellow. View along the a-axis illustrating structural features corresponding to the (011) faces of titanate (1×2×10 cells).
FIG. 21C. Schematic representations of crystal structures for the orthorhombic protonic lepidocrocite ($H_xTi_{2-x/4}\square_{x/4}O_4$ (x~0.7, 0: vacancy)) titanate structure reconstruction to anatase $TiO_2$. $TiO_6$ octahedra are in blue, oxygen atoms are in red, and hydrogen atoms are in yellow. View along the b-axis depicting structural features along the (101) faces of anatase $TiO_2$ (3×1×3 cells).

In the present invention, no acid was used. However, note that the lattice mismatch between the (110) plane of protonic lepidocrocite titanate nanowire substrate and the (101) plane of the anatase TiO$_2$ nanocrystals is very small (~2%) (Yang et al., J. Am. Chem. Soc. 2005, 127, 270); the interplanar distances of $d_{110}$ (3.59 Å, protonic titanate) and $d_{101}$ (3.52 Å, anatase TiO$_2$) involved are rather similar. The protonic lepidocrocite titanate lattice, $H_xTi_{2-x/4}\square_{x/4}O_4$ (x~0.7, $\square$: vacancy), is composed of two-dimensional lepidocrocite γ-(FeOOH)-type sheets in which TiO$_6$ octahedra are connected to each other via edge-sharing and protons are localized between the layers. In other words, the individual lepidocrocite-type host layer resembles a continuous, planar two-dimensional array. (Ma et al., Chem. Phys. Lett. 2003, 380, 577; Sasaki et al., Chem. Mater. 1997, 9, 602.) The layered nature of the protonic titanate structures was clearly observed from HRTEM images of titanate tubes and wires (FIGS. 16b and 17c). Because these particular crystallographic features are also common to the anatase TiO$_2$ lattice and because these lattices are essentially perfectly aligned, it is reasonable to postulate that single-crystalline anatase TiO$_2$ nanocrystals can form and grow in situ from the protonic titanate nanowire surface (FIG. 21). (Zhu et al., J. Am. Chem. Soc. 2005, 127, 6730; Yang et al., J. Am. Chem. Soc. 2005, 127, 270.) That is, the low interfacial lattice mismatch between titanate and titania could lower the heteronucleation energy barrier required for growth of the nanoparticles. (Zhang et al., J. Am Chem. Soc. 2005, 127, 13492.)

Hence, while the aggregation of small, independently generated anatase TiO$_2$ nanoparticles on the surfaces of protonic titanate nanowires is an attractive option, the present observations are better suited to a direct deposition process relying on an in situ nucleation event followed by subsequent oriented crystal growth and precipitation of tiny anatase TiO$_2$ nanoparticles onto the underlying protonic titanate backbone. That is, localized dissolution of the precursor protonic titanate nanowires and an in situ transformation into spontaneously oriented anatase TiO$_2$ nanoparticles, undergoing self-aggregation is probable. This is the basis of the so-called "contact epitaxy" mechanism, previously observed for silver clusters supported on a Cu(001) surface. (Yeadon et al., *J. M. Appl. Phys. Lett.* 1998, 73, 3208; Penn et al., *Science* 1998, 281, 969; Penn et al., *Geochim. Cosmochim. Acta* 1999, 63, 1549.) In the present case, the driving force for this spontaneous oriented attachment is the small lattice mismatch between the (110) plane of protonic titanate and (101) plane of anatase $TiO_2$; the elimination of this pair of high energy surfaces leads to a substantial reduction in the surface free energy of the resulting interface, thermodynamically speaking. (Barnard et al., *Nano Lett.* 2005, 5, 1261; Banfield et al., *Science* 2000, 289, 751.) This effect is coupled with mechanical relaxation of the highly stressed interface upon epitaxial alignment of the anatase $TiO_2$ nanocrystals with the underlying protonic lepidocrocite titanate nanowire substrate. (Yang et al., *J. Am. Chem. Soc.* 2005, 127, 270; Zhang et al., *J. Am Chem. Soc.* 2005, 127, 13492; Banfield et al., *Science* 2000, 289, 751; Liu et al., *J. Phys. Chem. B* 2004, 108, 2788.) Moreover, this mechanism is conducive to retention of the wire morphology, as the directed self-aggregation process of anatase $TiO_2$ nano-crystals has a low energy requirement for initially breaking bonds within the hydrogen titanate framework and then reforming these bonds into anatase titania. (Zhu et al., *J. Am. Chem. Soc.* 2005, 127, 6730; Liu et al., *J. Phys. Chem. B* 2004, 108, 2788.) Therefore, this process can take place under moderate conditions of low temperature and low pressure, as observed.

Even so, for small precursor protonic lepidocrocite titanate nanowires (≤0.200 nm in diameter), it is relatively easier, based on relative growth rates along different planes, to form small equidimensional particles similar in dimension to the starting material. Therefore, for these small hydrogen titanate nanowires, their transformation to anatase $TiO_2$ nanowires was effectively a simple, in situ phase conversion process. Alternatively, anatase $TiO_2$ nanowire formation can be explained as resulting from as-formed smaller anatase $TiO_2$ nanoparticles more easily attaching to the hydrogen titanate nanowire surface by attractive van der Waals forces (the "hit-and-stick" scenario), subsequently aggregating, and ultimately fusing to form elongate single crystals. (Pei et al., *Langmuir* 2004, 20, 7837.)

Figure 22:
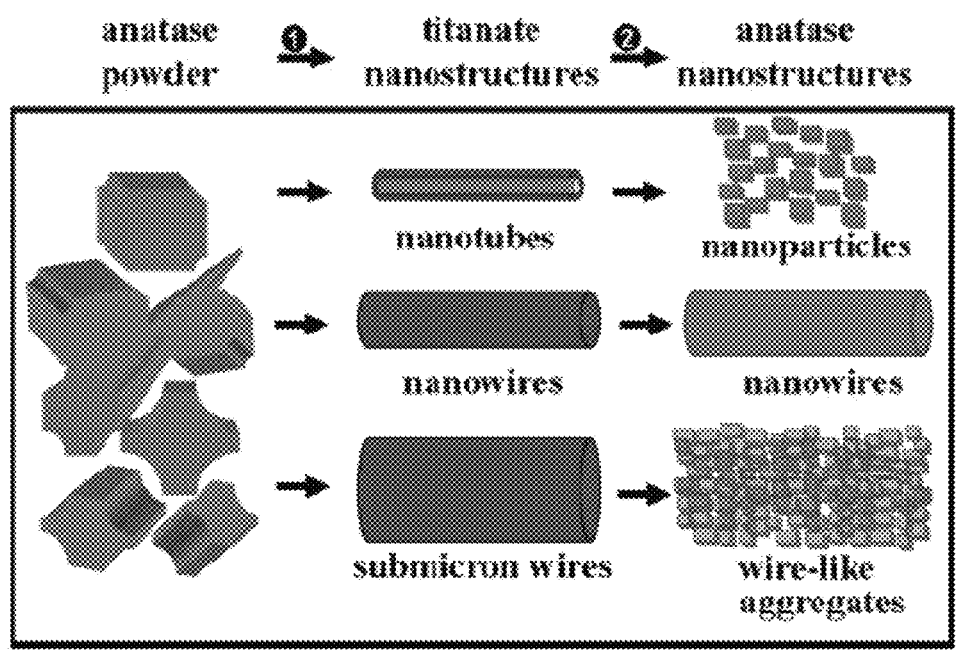
FIG. 22. Schematic representation of the size- and shape-dependence of the morphological transformation of hydrogen titanate nanostructures into their anatase analogues. Step 1 represents the preparation of hydrogen titanate nanostructures, neutralized from sodium hydrogen titanate nanostructures that, in turn, had been initially hydrothermally synthesized from commercial anatase $TiO_2$ powder. Step 2 represents the hydrothermal size- and shape-dependent transformation process of orthorhombic protonic lepidocrocite titanate ($H_xTi_{2-x/4}\square_{x/4}O_4$ (x~0.7, 0: vacancy)) nanostructures into anatase titania nanostructures at 170° C. for 24 h.

On the basis of the detailed analysis of the HRTEM and SAED data, the proposed size-dependent shape transformation of hydrogen titanate nanostructure precursors into their anatase $TiO_2$ counterparts is illustrated in FIG. 22. It is expected that synthetic advances in achieving monodispersity and diameter control over the size and shape distribution of hydrogen titanate nanostructure precursors can aid in optimizing the morphological transformation process described herein.

Photocatalytic Activity.

Figure 23:
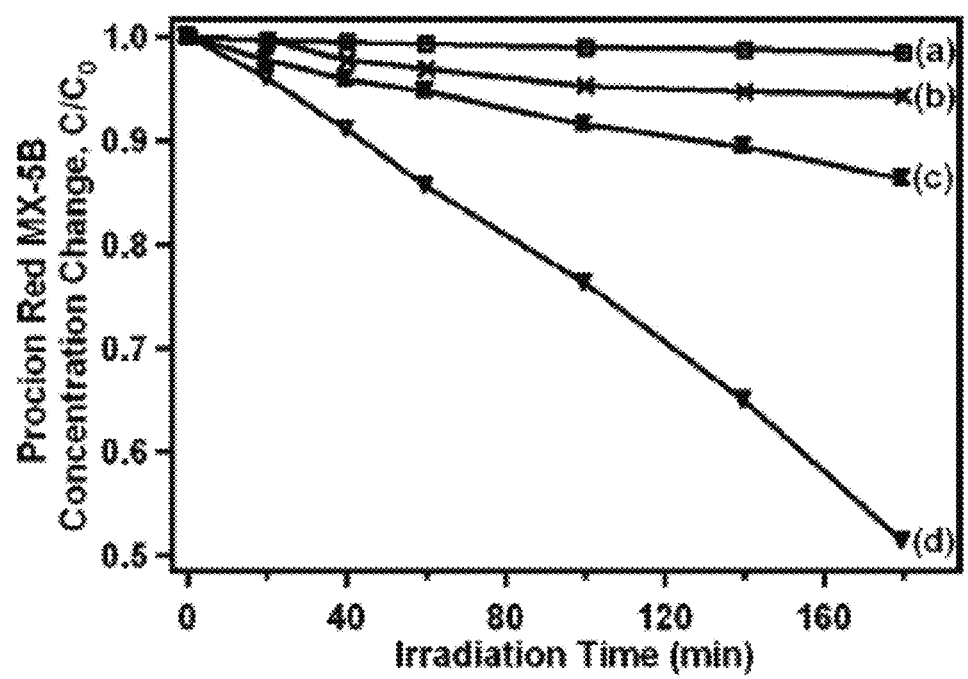
FIG. 23. Photocatalytic activity of the samples in the presence of Procion Red MX-5B: (a) blank control; (b) commercial anatase $TiO_2$ (Alfa Aesar, 32 nm powder); (c) as-prepared anatase $TiO_2$ nanoparticles; (d) as-prepared anatase $TiO_2$ wires.

The photocatalytic activity of the as-prepared anatase $TiO_2$ nanostructures of the present invention was evaluated by measuring the degradation of synthetic Procion Red MX-5B dye at 538 nm upon photoexcitation with light at 365 nm. It is evident that both anatase $TiO_2$ nanoparticles and nanowires (FIGS. 18 and 19, respectively), prepared from nanoscale titanate precursors, are active photocatalysts, as illustrated in FIG. 23. Moreover, the as-prepared anatase $TiO_2$ nanoparticles (FIG. 23c) and wires (FIG. 23d) exhibit higher photoactivities as compared with similarly sized commercial $TiO_2$ nanoscale powders (FIG. 23b), from whence the parent titanate nanostructure precursors, used to generate the titania nanostructures of the present invention, were initially derived.

The observed enhancement of photocatalytic activity, relative to a commercial sample, may be related to an increase in surface area as well as with a rise in anatase mass fraction and crystallinity (Xu et al., *Langmuir* 2001, 17, 897; Jang et al., *J. Nanopart. Res.* 2001, 3, 141), characteristic of the pure, as-prepared anatase titania nanostructures of the present invention. Moreover, an increased amount of hydroxyl species on the surfaces of as-prepared anatase $TiO_2$ nanoscale samples could also explain the heightened decomposition rate observed. (Cao et al., *J. Catal.* 1999, 188, 48; Vorontsov et al., *J. Photochem. Photobiol. A* 2001, 144, 193.) In addition, it was also found that the parent titanate precursor nanostructures exhibited minimal or no catalytic performance, consistent with a previous report for undoped trititanate nanotube samples (Hados et al., *Chem. Phys. Lett.* 2004, 399, 512), which may be attributed to the higher band gap energy of the titanate samples relative to that of titania (FIGS. 15a and 15b) and hence a higher energy of irradiation (than the 365 nm light used in this study) needed for optimal photocatalytic activation. Furthermore, the anatase $TiO_2$ nanowires (FIG. 23d) exhibited an increased photoactivity relative to that of anatase $TiO_2$ nanoparticles (FIG. 23c). The morphology-driven energy shift and broadening of the absorption spectrum of anatase $TiO_2$ nanowires (FIG. 15d), with respect to that of anatase $TiO_2$ nanoparticles (FIG. 15c), can account for the increased photoactivity. (Burda et al., *Nano Lett.* 2003, 3, 1049.) As implied previously, the particulate size, degree of aggregation, surface chemistry, and surface area of these nanostructures are also important parameters that affect the data.

Figures designated as S is available free of charge at http://pubs.acs.org.

TABLE 1

Comparison of Observed XRD Reflections from As-synthesized Hollow Micrometer-scale Spherical Assemblies of Titanate 1D Nanostructures (after HCl neutralization) with Literature Data for an $H_2Ti_3O_7$-type Compound[30] (JCPDS File No. 36-0654) as Well as Literature Values Reported for Nanotubes of a Known Lepidocrocite Titanate Composition[29]

| $H_2Ti_3O_7$ (ref 30, JCPDS No. 36-0654) | | | | nanotubes of lepidocrocite titanate (ref 29) | | | | as-synthesized 3D assemblies of hydrogen titanate 1D nanostructures (this work) | | | |
|---|---|---|---|---|---|---|---|---|---|---|---|
| 2θ (deg) | d (Å) | $I/I_o$ | hkl | 2θ (deg) | d (Å) | $I/I_o$ | hkl | 2θ (deg) | d (Å) | $I/I_o$ | hkl |
| 9.795 | 9.03 | 20 | 001 | 9.5 | 9.26 | 100 | 020 | 9.6 | 9.20 | 64 | 020 |
| 11.257 | 7.86 | 100 | 100 | 24.5 | 3.61 | ~15 | 110 | 24.7 | 3.60 | 100 | 110 |
| 16.354 | 5.42 | 60 | 101 | 28 | 3.17 | ~40 | 130 | 28.02 | 3.18 | 68 | 130 |
| 24.372 | 3.65 | 100 | 102 | 48 | 1.89 | ~50 | 200 | 38.76 | 2.32 | 19 | 051 |

TABLE 1-continued

Comparison of Observed XRD Reflections from As-synthesized Hollow Micrometer-scale Spherical Assemblies of Titanate 1D Nanostructures (after HCl neutralization) with Literature Data for an $H_2Ti_3O_7$-type Compound[30] (JCPDS File No. 36-0654) as Well as Literature Values Reported for Nanotubes of a Known Lepidocrocite Titanate Composition[29]

| $H_2Ti_3O_7$ (ref 30, JCPDS No. 36-0654) | | | | nanotubes of lepidocrocite titanate (ref 29) | | | | as-synthesized 3D assemblies of hydrogen titanate 1D nanostructures (this work) | | | |
|---|---|---|---|---|---|---|---|---|---|---|---|
| 2θ (deg) | d (Å) | I/I$_o$ | hkl | 2θ (deg) | d (Å) | I/I$_o$ | hkl | 2θ (deg) | d (Å) | I/I$_o$ | hkl |
| 29.75 | 3.00 | 60 | 003 | 62 | 1.49 | ~20 | 002 | 48.22 | 1.88 | 54 | 200 |
| 36.055 | 2.49 | 60 | | | | | | | | | |
| 43.93 | 2.06 | 60 | 104 | | | | | | | | |
| 48.526 | 1.876 | 60 | 020 | | | | | | | | |

TABLE 2

Comparison of Observed XRD Reflections from As-synthesized Hollow Micrometer-scale Spherical Assemblies of Titania 1D Nanostructures (after annealing) with Literature Results[20] Reported for Hexagonal Anatase (JCPDS File No. 21-1272)

| $TiO_2$ (Anatase, ref 20, JCPDS File No. 21-1272) | | | | as-synthesized 3D assemblies of anatase titania 1D nanostructures (this work) | | | |
|---|---|---|---|---|---|---|---|
| 2θ (deg) | d (Å) | I/I$_o$ | hkl | 2θ (deg) | d (Å) | I/I$_o$ | hkl |
| 25.281 | 3.520 | 100 | 101 | 25.2 | 3.529 | 100 | 101 |
| 36.947 | 2.431 | 10 | 103 | | | | |
| 37.801 | 2.378 | 20 | 004 | 37.78 | 2.378 | 22 | 004 |
| 38.576 | 2.332 | 10 | 112 | | | | |
| 48.050 | 1.892 | 35 | 200 | 48.04 | 1.892 | 32 | 200 |
| 53.890 | 1.699 | 20 | 105 | 53.92 | 1.698 | 18 | 105 |
| 55.062 | 1.667 | 20 | 211 | 55.10 | 1.665 | 19 | 211 |

TABLE 3

Comparison of Observed Raman Peaks (cm$^{-1}$) with Literature Data[14, 34] for As-synthesized Hollow 3D Micrometer-scale Spherical Assemblies of Lepidocrocite Titanate and of Anatase Titania 1D Nanostructures, Respectively

| protonic lepidocrocite titanate | | anatase titania | | |
|---|---|---|---|---|
| literature (ref 14) | as-synthesized 3D assemblies of hydrogen titanate 1D nanostructures (this work) | literature (ref 34) | as-synthesized 3D assemblies of anatase titania 1D nanostructures (this work) | band assignments |
| 145 | | 143 | 147 | $E_g$ |
| 195 | 195 | 196 | 198 | $E_g$ |
| 280 | 230 | 396 | 393 | $B_{1g}$ |
| 450 | 450 | 515 | 515 | $A_{1g}$ |
| 640 | 640 | 638 | 640 | $E_g$ |
| 920 | 920 | | | |

The invention claimed is:

1. A method of making anatase nanomaterials comprising:
   (a) mixing titania powder and an alkali metal hydroxide solution to form a mixture;
   (b) heating the mixture thereby forming a precipitate comprising one-dimensional alkali metal hydrogen titanate nanomaterials,
   (c) neutralizing the alkali metal hydrogen titanate nanomaterials thereby forming hydrogen titanate nanomaterials; and
   (d) hydrothermally processing the formed hydrogen titanate nanomaterials thereby forming anatase nanomaterials, wherein hydrothermal processing comprises dispersing the hydrogen titanate nanomaterials in water under neutral conditions, and heating at about 100° C. to about 200° C.

2. The method of claim 1 wherein the ratio, based on relative mass, of the hydrogen titanate nanomaterials:water is about 2:1 to about 10:3.

3. The method of claim 1 wherein the alkali metal hydroxide is lithium hydroxide, sodium hydroxide, potassium hydroxide, rubidium hydroxide, cesium hydroxide, or combinations thereof.

4. The method of claim 1 wherein the temperature to which the mixture is heated in step (b) is about 100° C. to about 145° C., whereby the formed hydrogen titanate nanomaterials are at least 99% nanotubes.

5. The method of claim 4 wherein the formed anatase nanomaterials are single crystalline anatase nanoparticles.

6. The method of claim 1 wherein the temperature to which the mixture is heated in step (b) is about 150° C. to about 200° C., whereby the formed hydrogen titanate nanomaterials are at least 99% nanowires, wherein nanowires with diameters less than 200 nm are designated as small, and wherein nanowires with diameters of greater than about 200 nm are designated as large.

7. The method of claim 6 wherein the formed anatase nanomaterials are single crystalline anatase nanowires which are formed from the small hydrogen titanate nanowires.

8. The method of claim 6 wherein the formed anatase nanomaterials are anatase nanocrystal aggregates which are formed from the large hydrogen titanate nanowires.

* * * * *